Oct. 16, 1934.  A. AHRNDT  1,976,824
BACON SLICING MACHINE
Filed Jan. 16, 1929   28 Sheets-Sheet 1

Fig. 3.

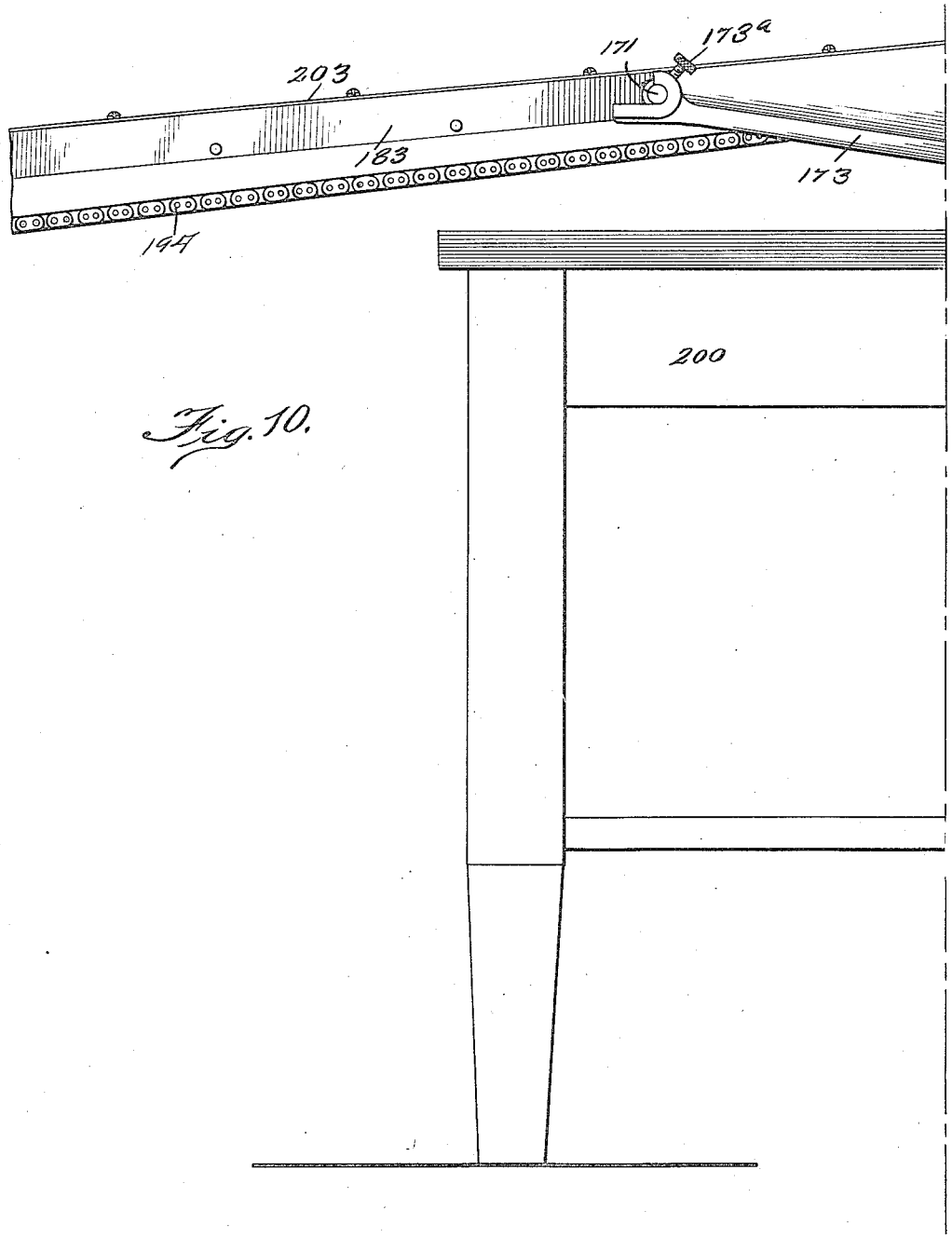

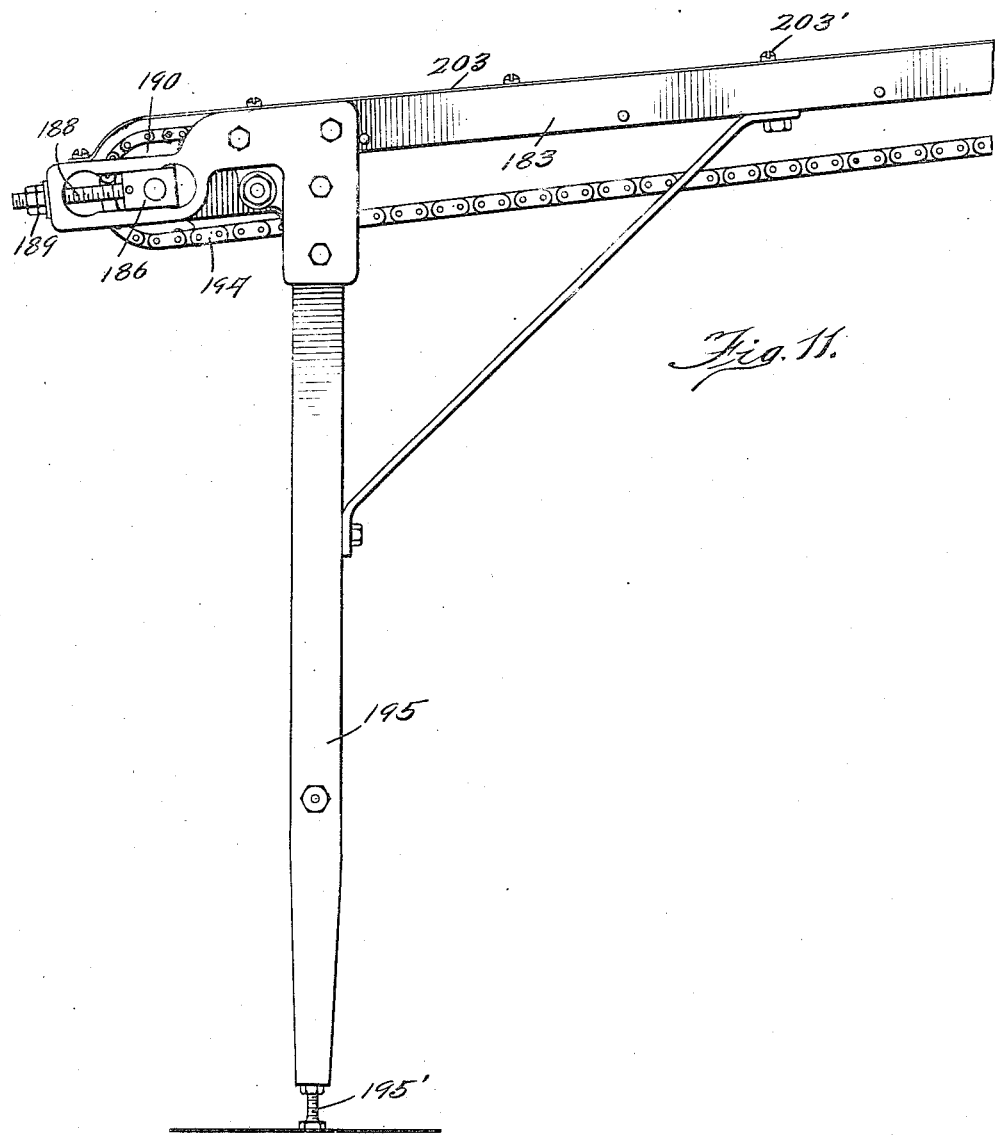

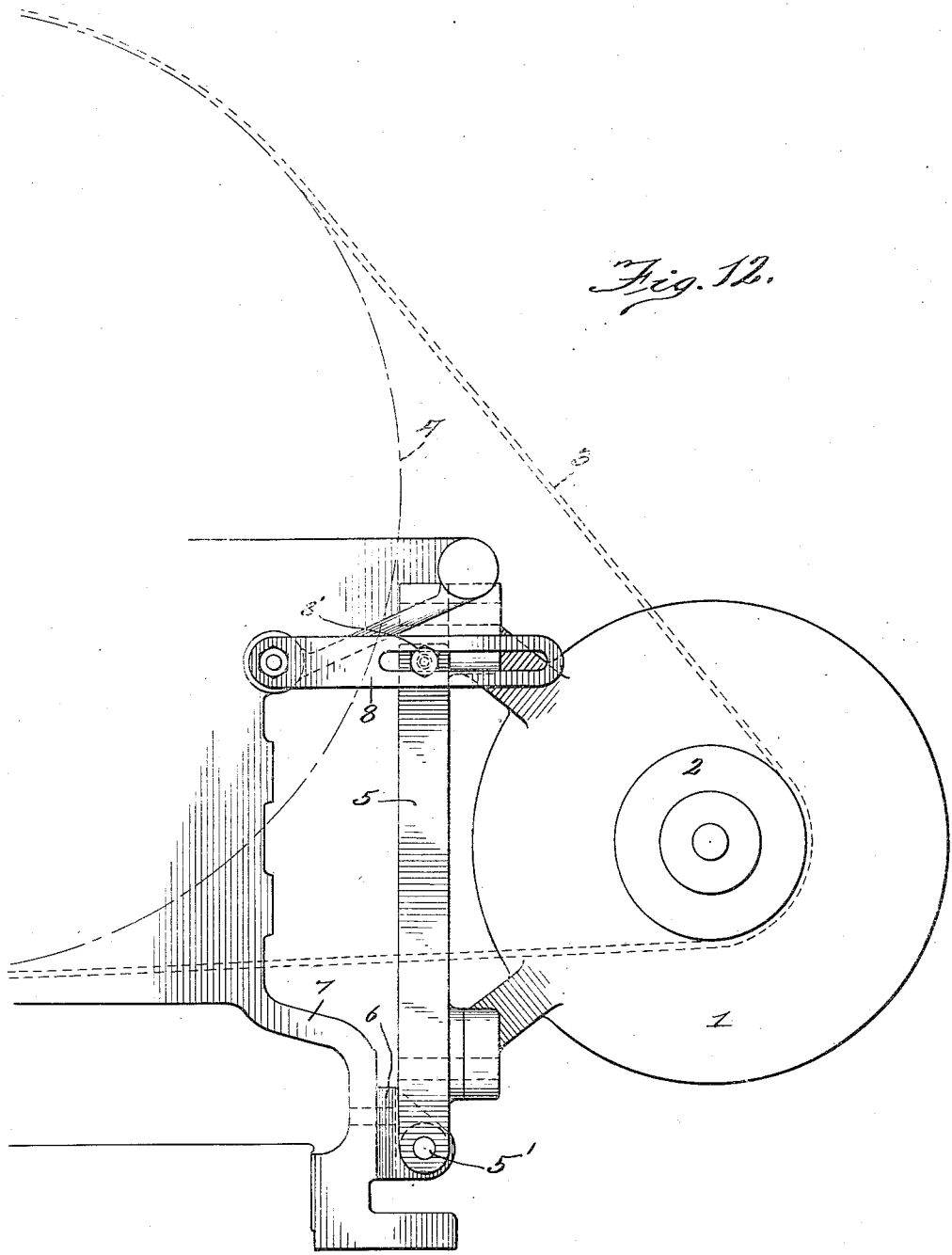

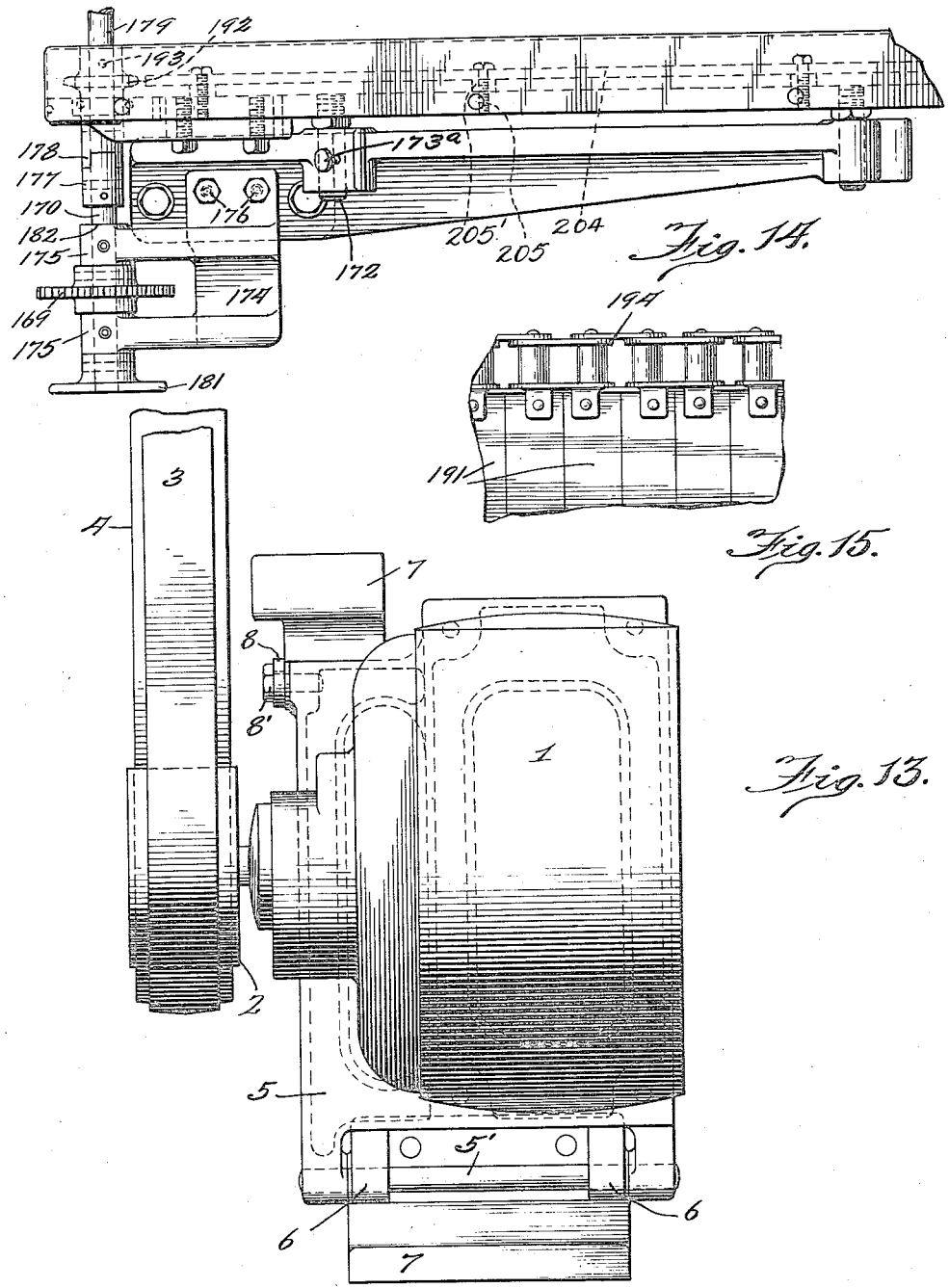

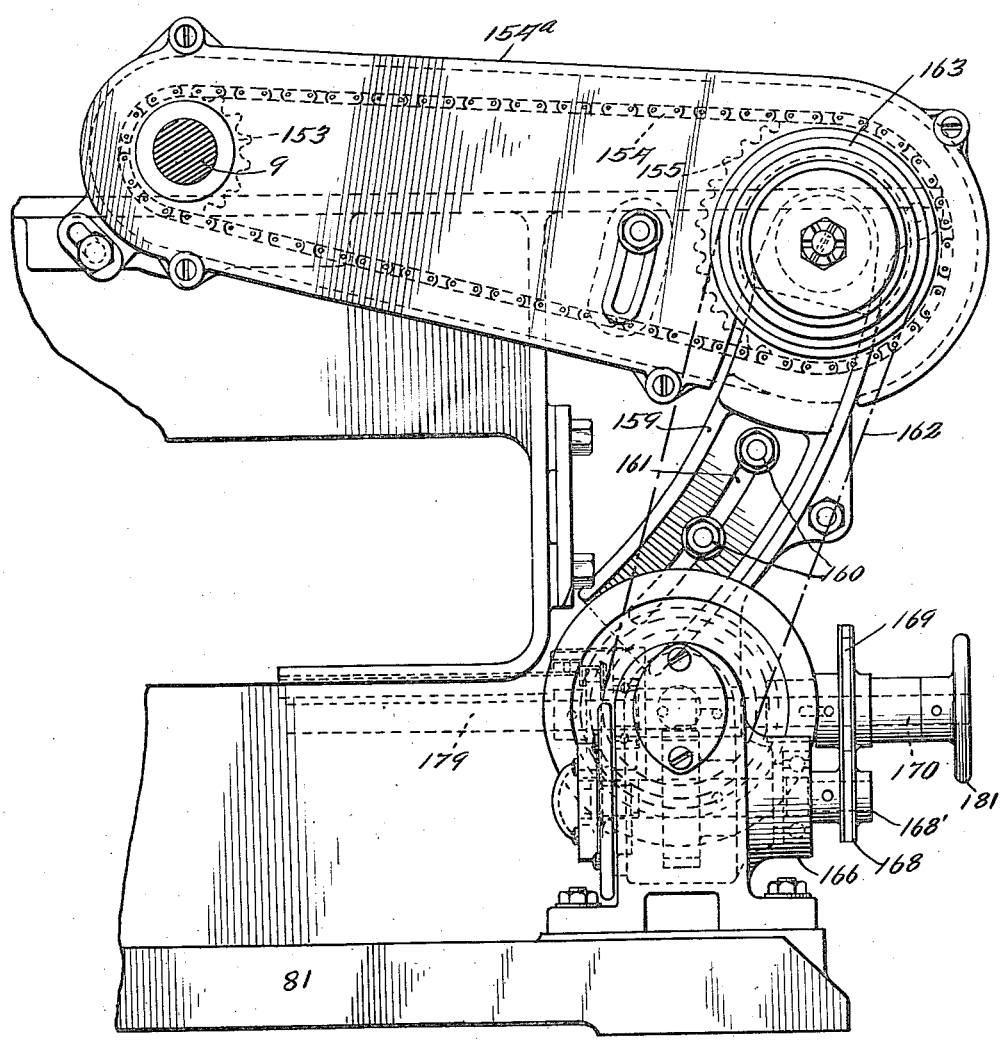

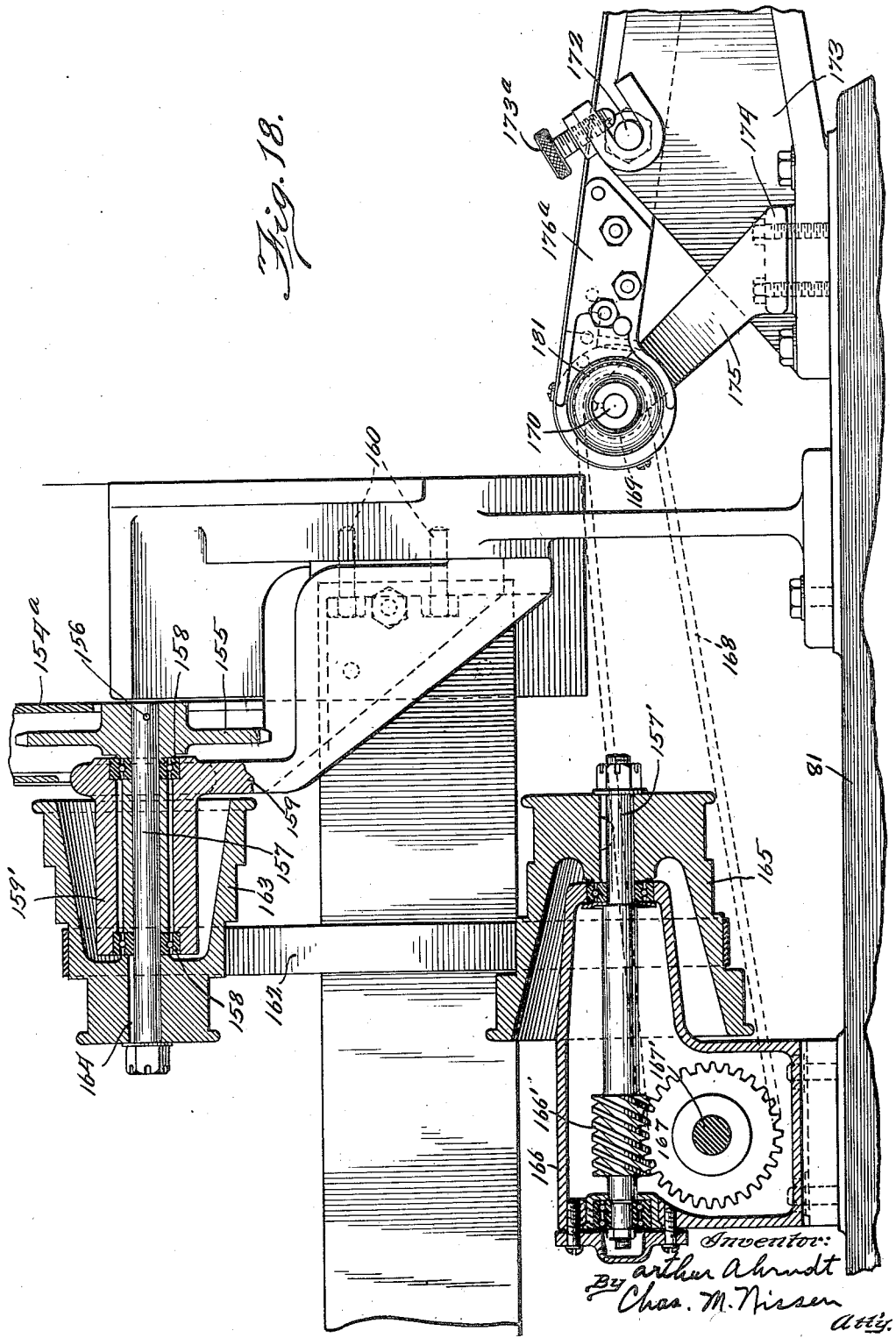

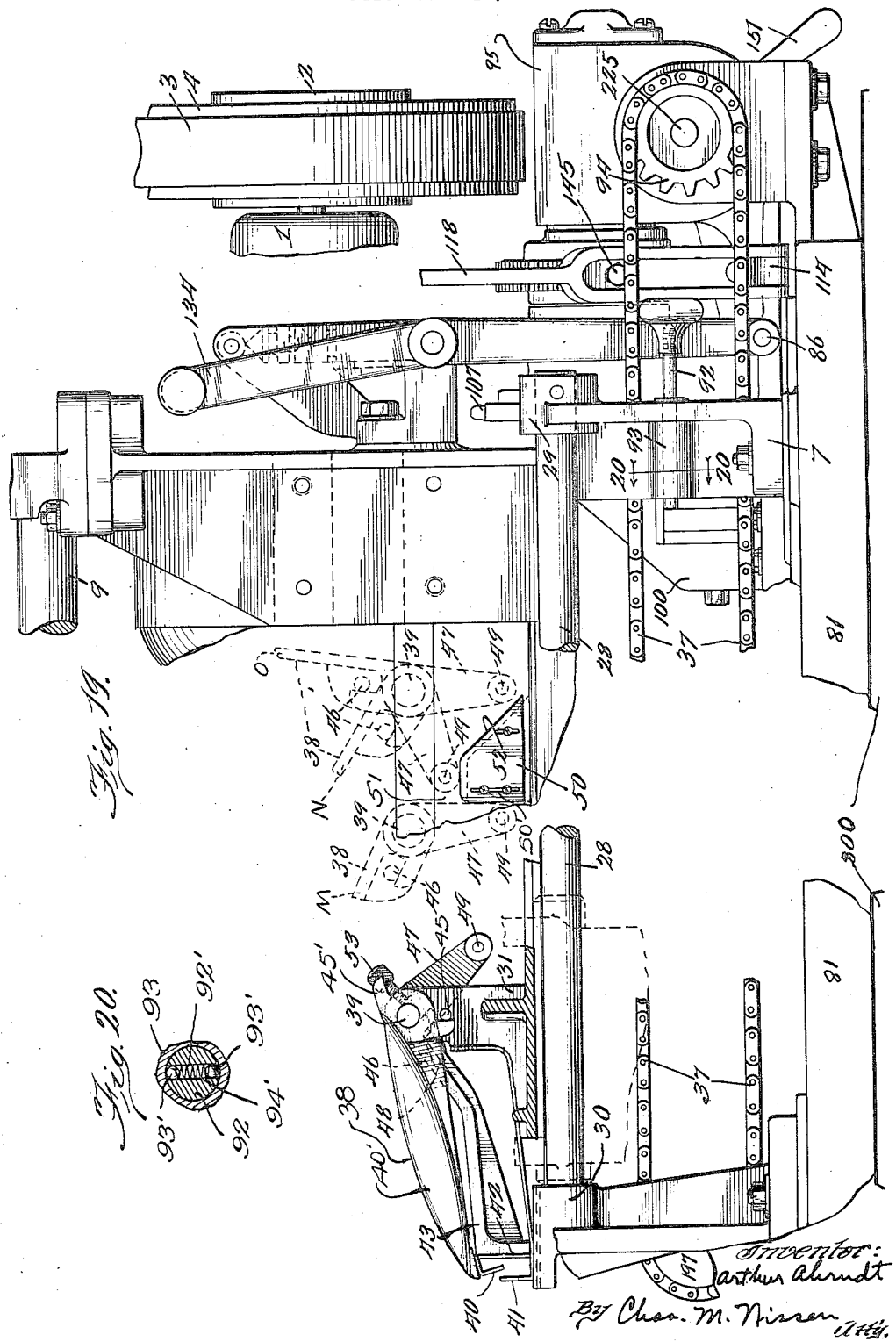

Oct. 16, 1934.  A. AHRNDT  1,976,824
BACON SLICING MACHINE
Filed Jan. 16, 1929  28 Sheets-Sheet 18
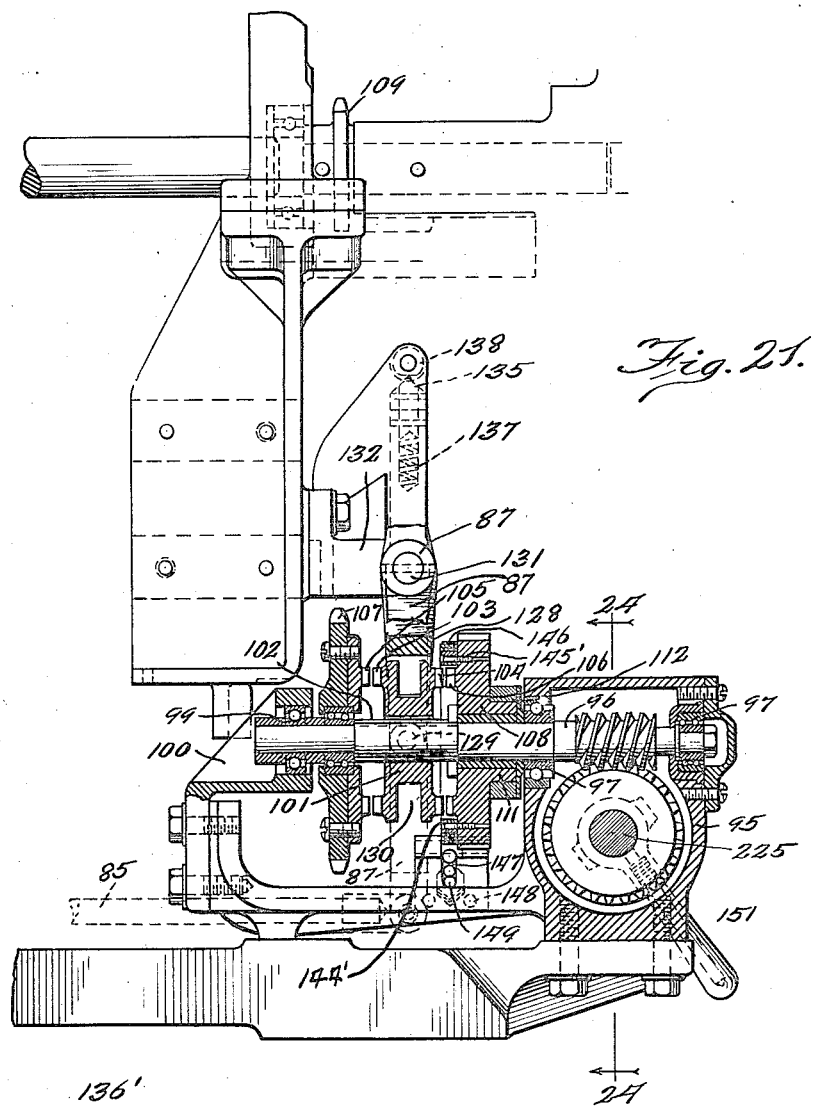
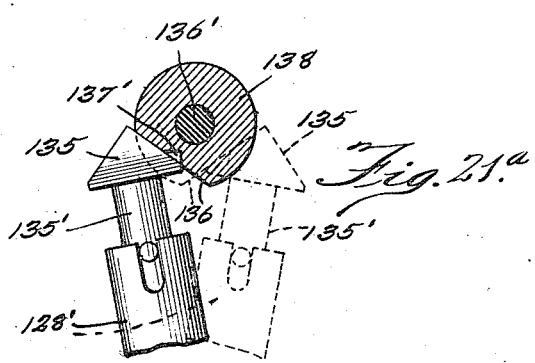
Inventor:
Arthur Ahrndt
By Chas. M. Nissen
Atty.

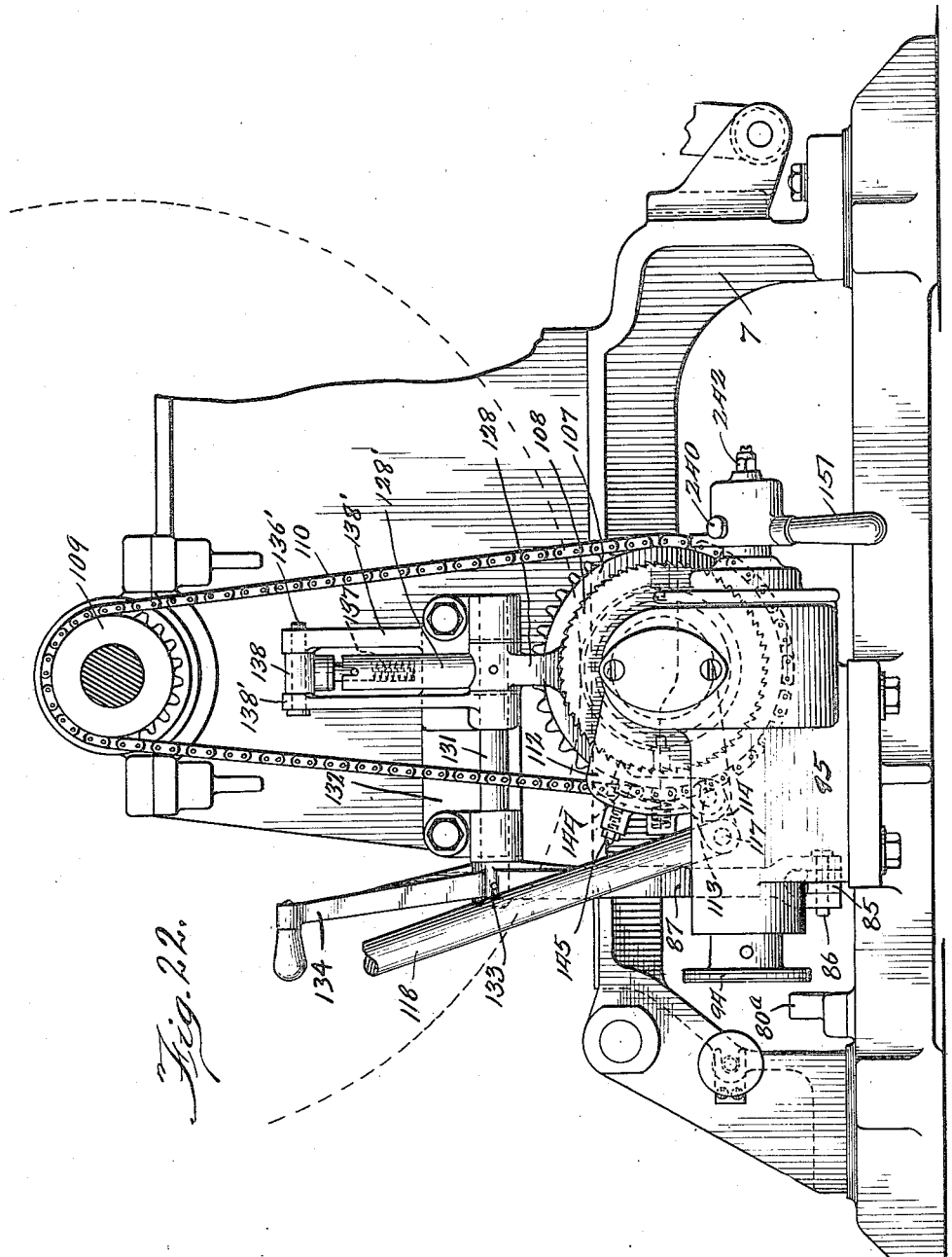

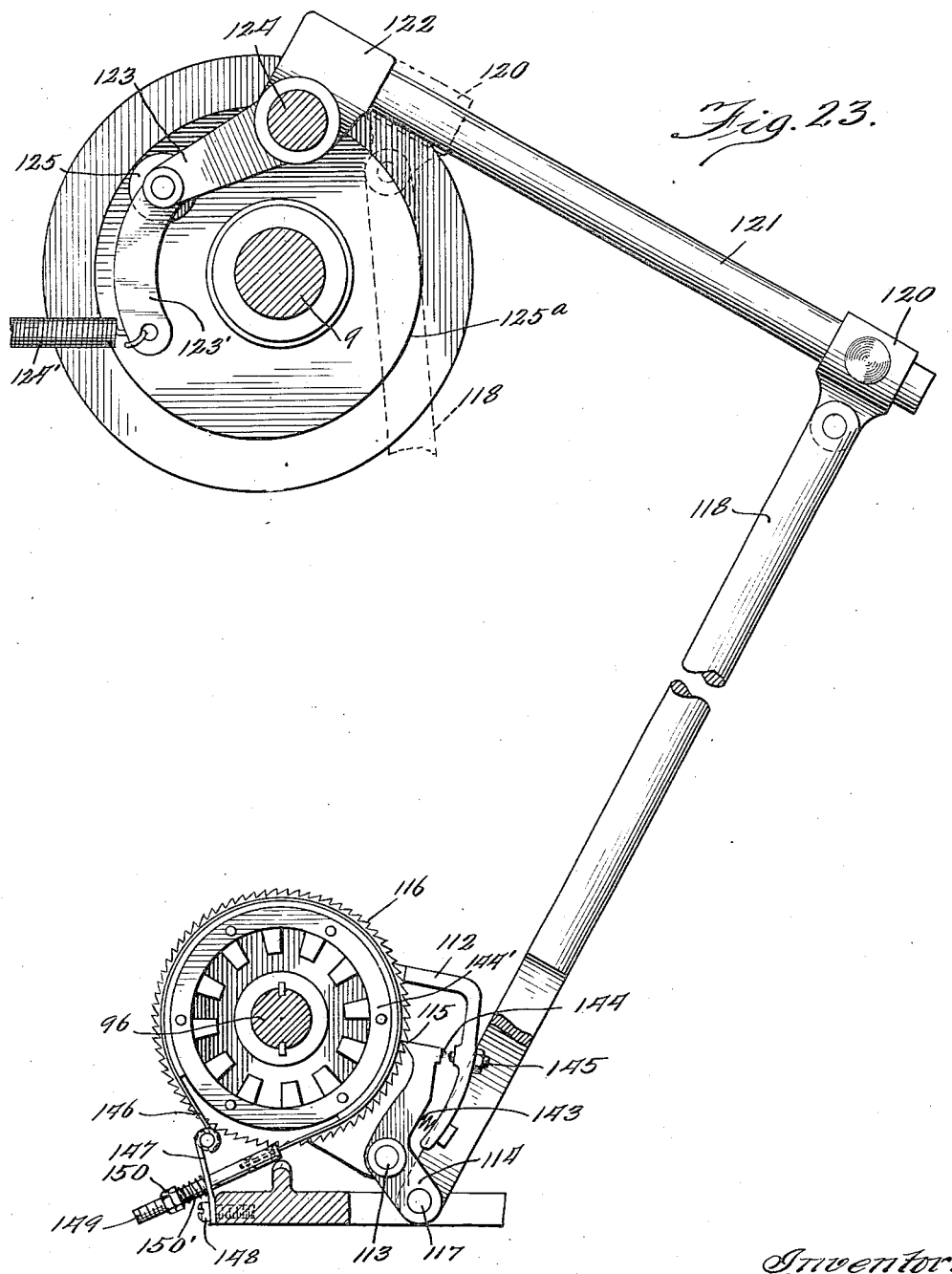

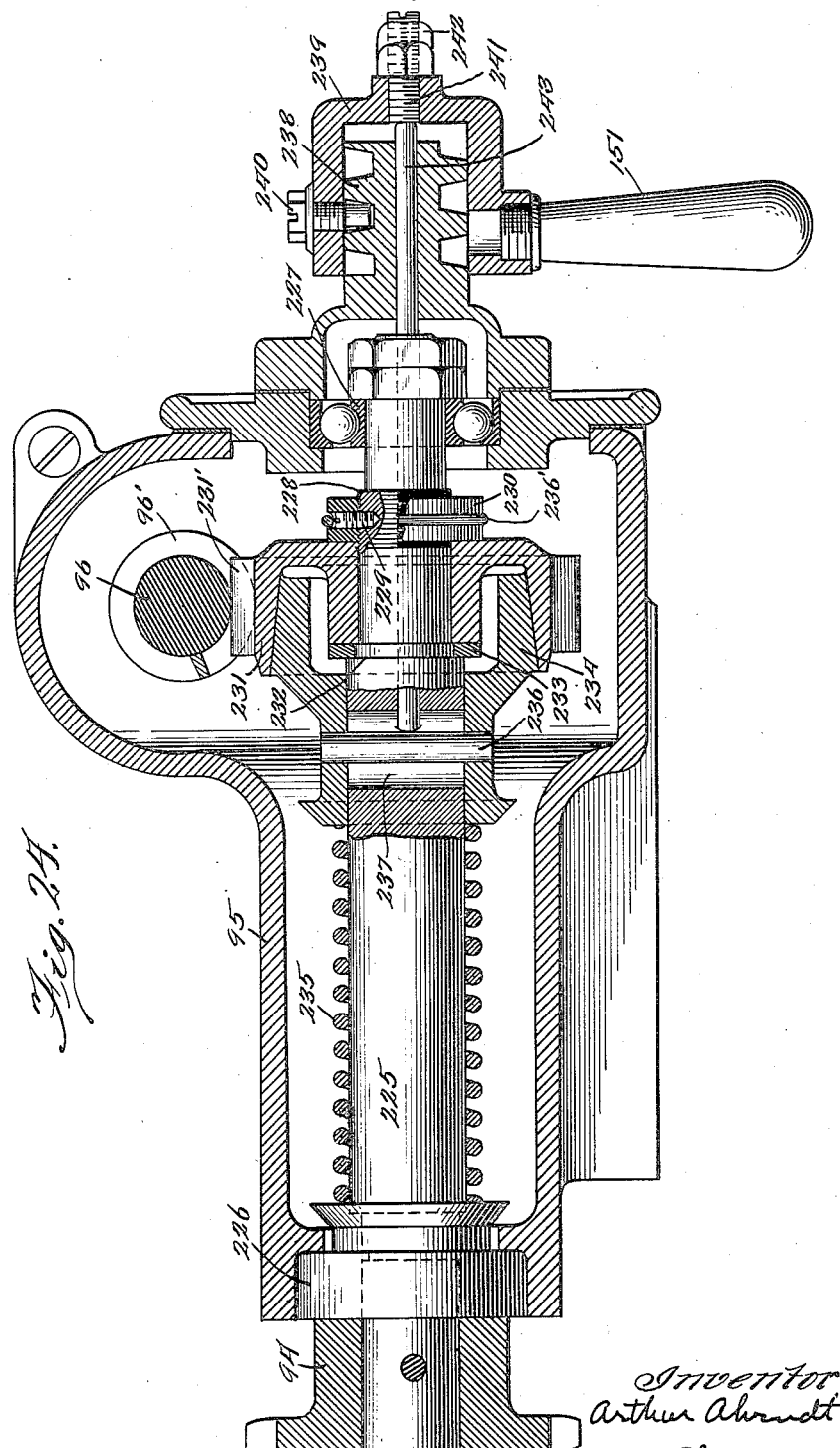

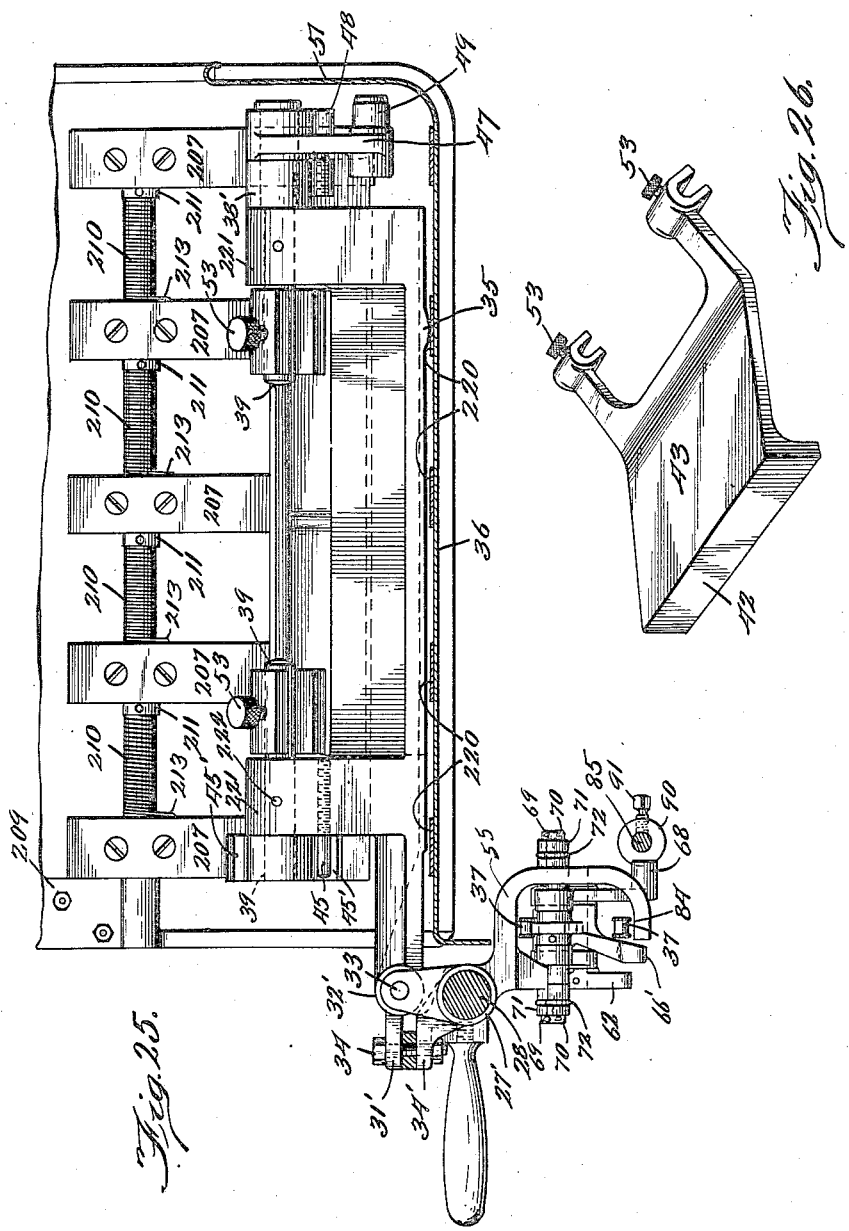

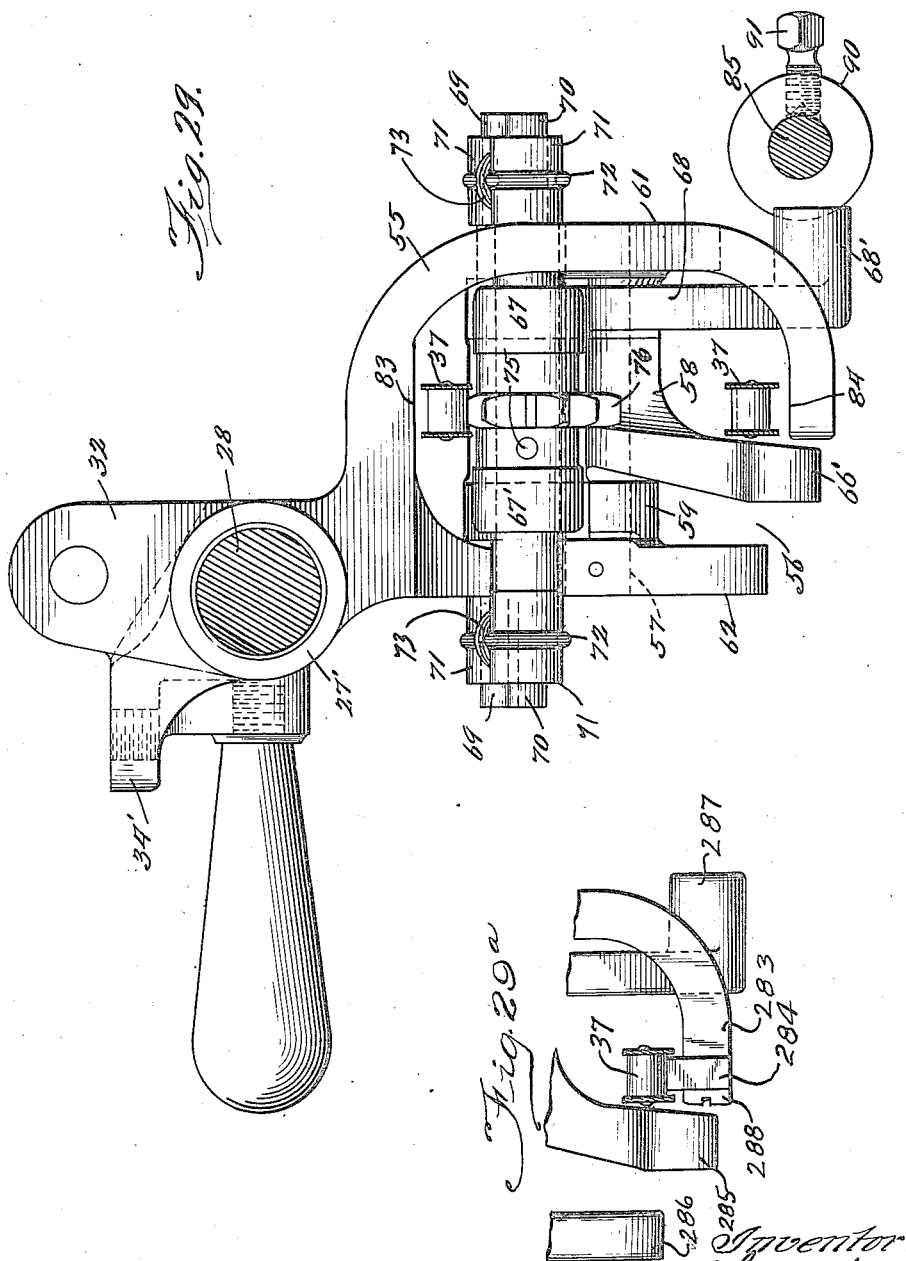

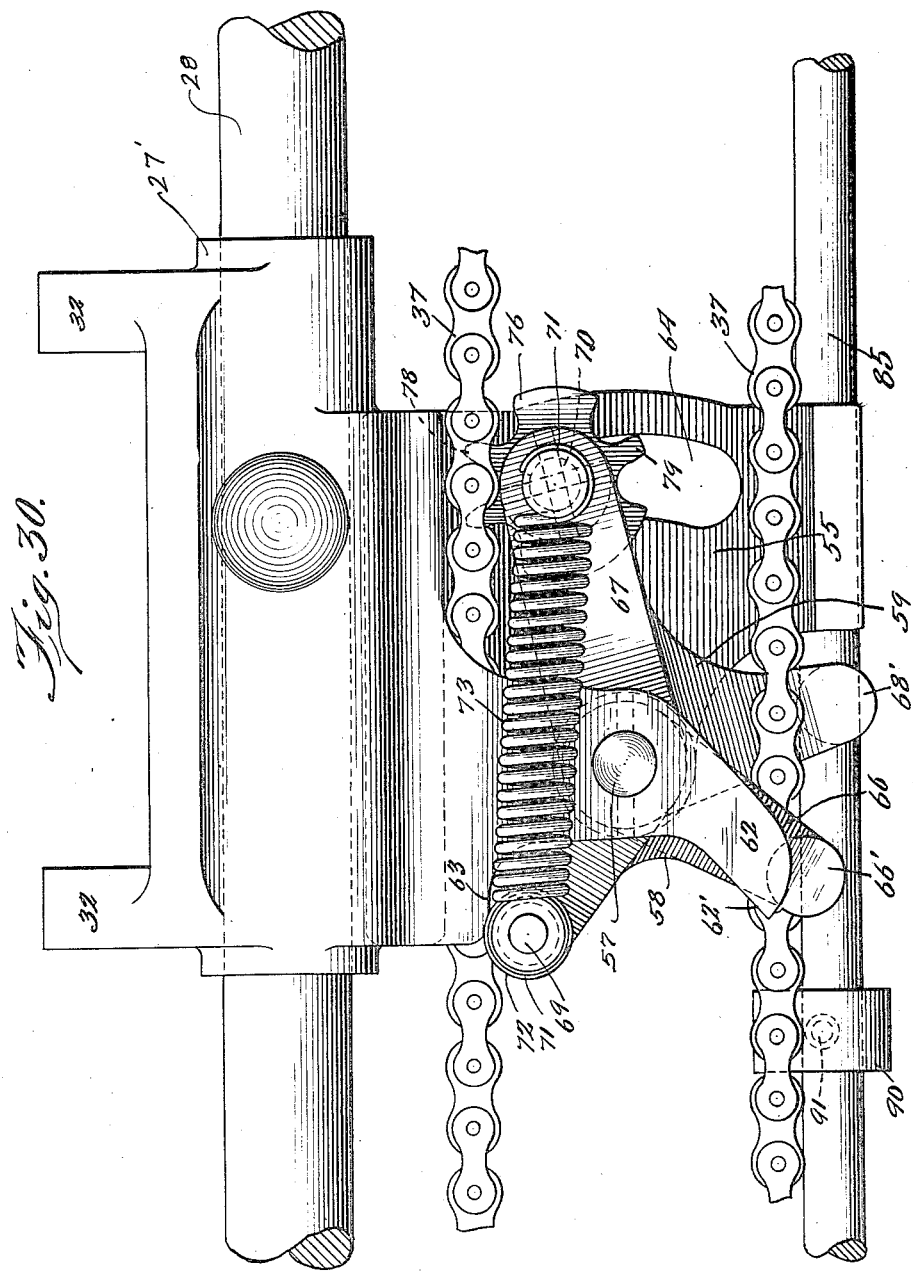

Oct. 16, 1934.  A. AHRNDT  1,976,824
BACON SLICING MACHINE
Filed Jan. 16, 1929   28 Sheets-Sheet 26
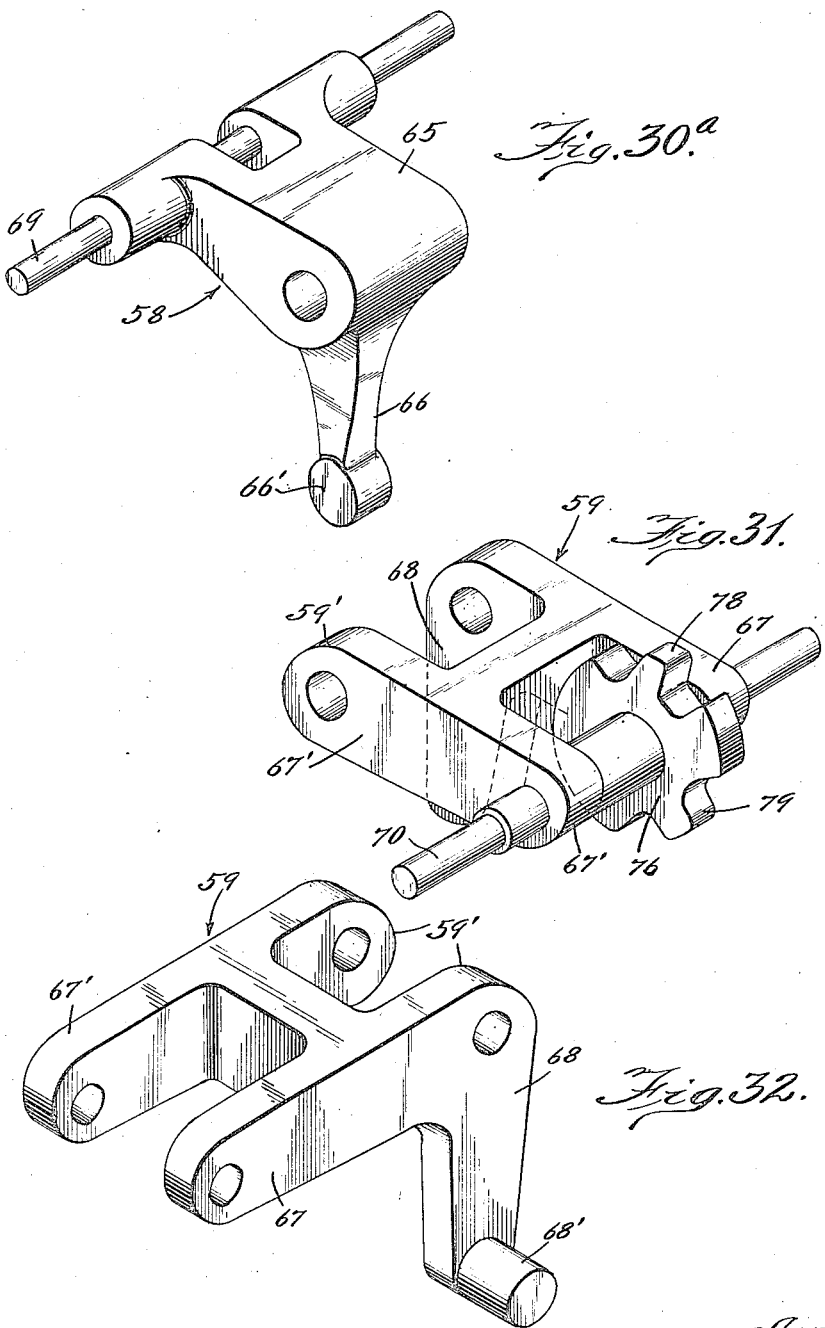

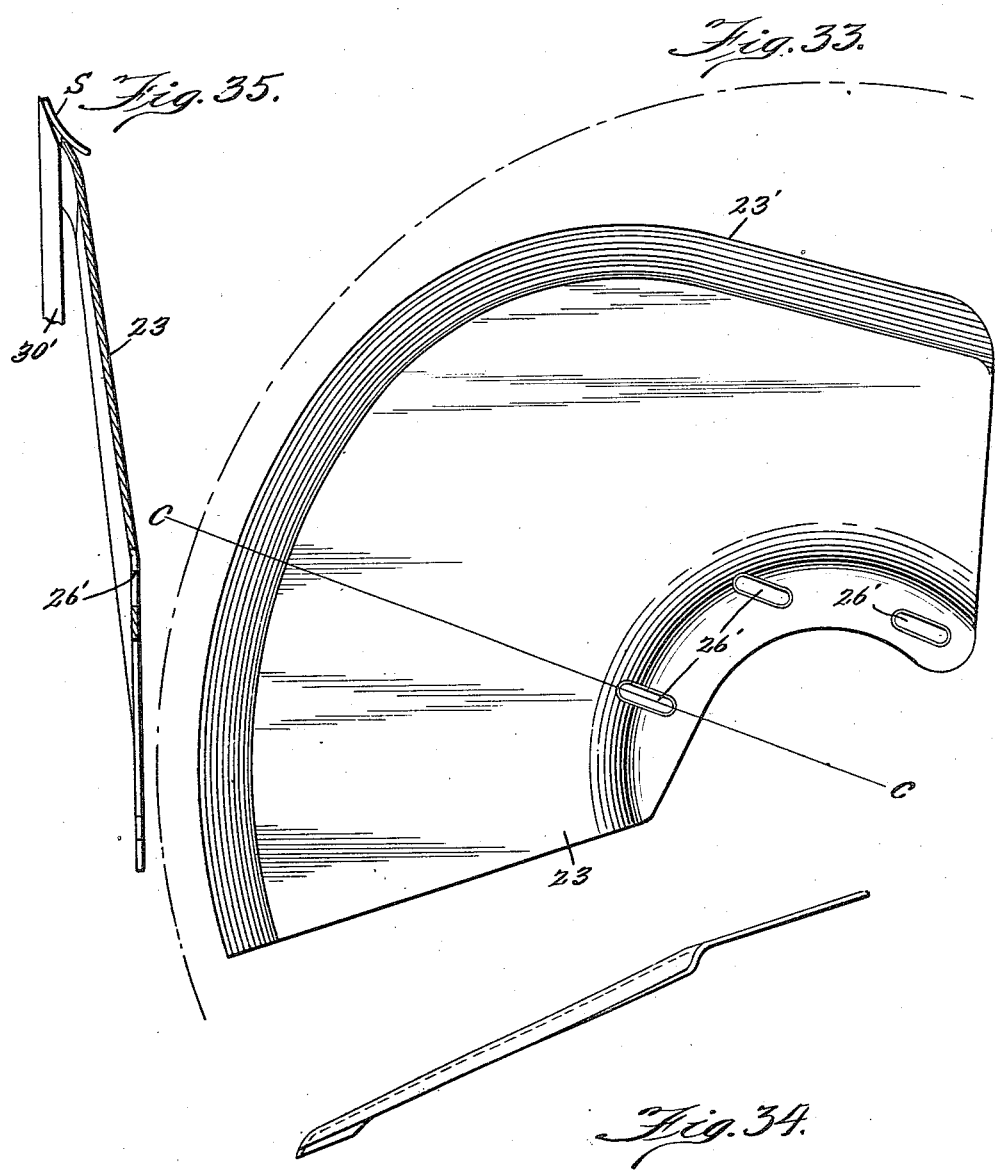

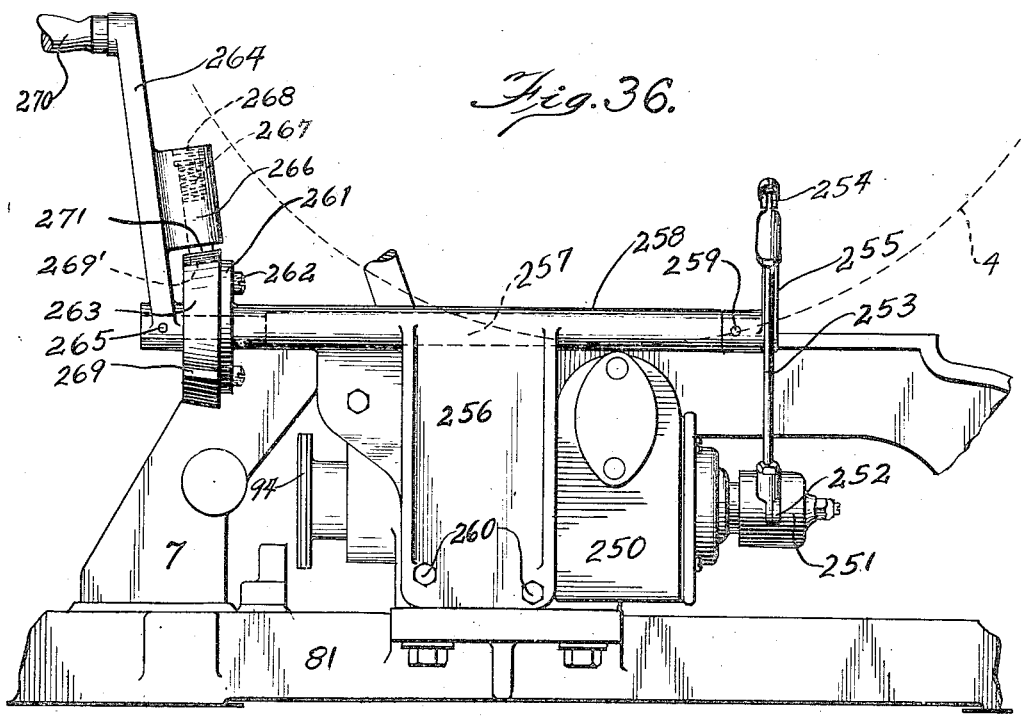
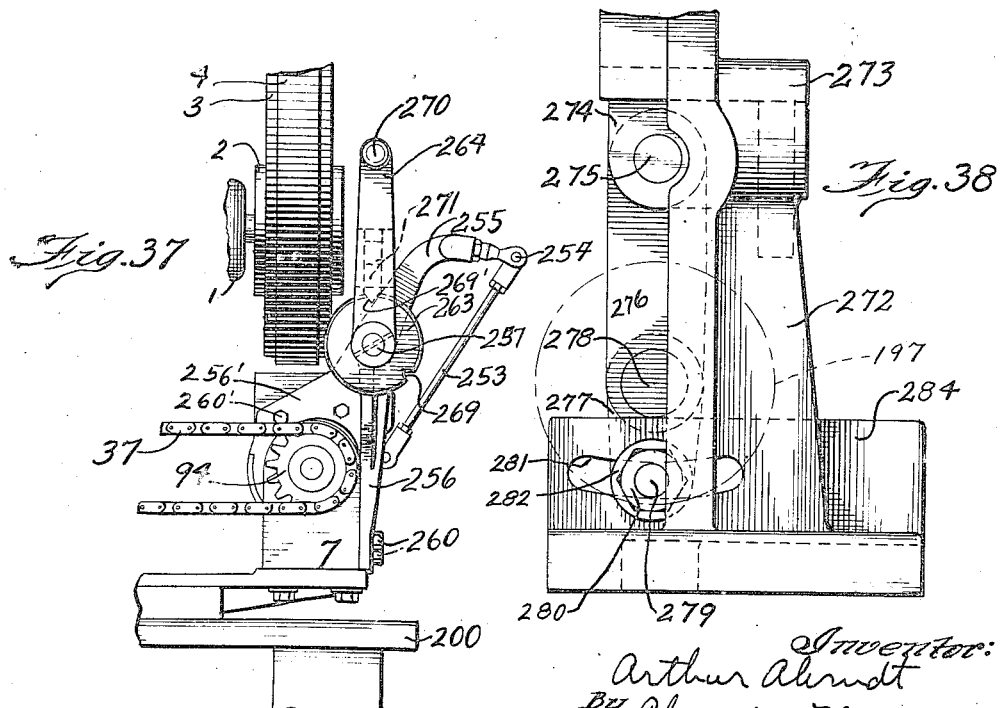

Patented Oct. 16, 1934

1,976,824

UNITED STATES PATENT OFFICE 1,976,824

BACON SLICING MACHINE

Arthur Ahrndt, La Porte, Ind., assignor to U. S. Slicing Machine Company, La Porte, Ind., a corporation of Indiana Application January 16, 1929, Serial No. 332,790

61 Claims. (Cl. 146—101)

This invention relates to slicing machines, and more particularly to a machine designed to slice bacon or other material at high speed.

The machine forming the subject-matter of this application is of the same general nature as that shown in the application of William Mahler, Serial No. 332,525 filed January 14, 1929.

It is one object of the invention to provide the machine with an endless conveyer and driving means therefor.

Another object is to provide a drive for the conveyer that is driven in proper synchronism with the knife drive and the drive to the feed for the substance carriage.

Another object is to provide means for automatically reversing the direction of motion of the carriage at the end of the feeding and reverse movement of the carriage.

Another object is to automatically change the motion of the carriage from intermittent to continuous when the reversal of motion takes place at the knife end of the machine and to change the motion from continuous to intermittent upon reversal of motion at the loading end of the machine.

Another object is to provide novel means for effecting the continuous and intermittent motion and to shift from one to the other.

Another object is to provide an automatic raising means for the top grip of the carriage at the loading end of the machine.

Other objects will appear as the description proceeds.

In the drawings—

Fig. 3 is a plan drawn to an enlarged scale of the structure to the right of the substance carriage in Fig. 1;

Fig. 10 is an elevational view corresponding to Fig. 5 of a portion of the conveyer;

Fig. 11 is an elevational view corresponding to Fig. 6 of a portion of the conveyer;

Fig. 12 is an enlarged end elevation of the motor mounting as viewed from the right of Fig. 1;

Fig. 13 is an elevation as viewed from the right of Fig. 12;

Figs. 14 and 15 are detail plan views of a portion of the conveyer mechanism;

Fig. 17 is an end elevation of the conveyer drive step pulley assembly;

Fig. 18 is a side elevation of the conveyer step pulley assembly;

Fig. 19 is an elevation, partly in section, of part of the machine omitting the reversing mechanism for the substance carriage;

Fig. 20 is a section taken on the line 20—20 of Fig. 19;

Fig. 21 is an elevational view, partly in section, of a portion of the substance carriage driving and feeding mechanism;

Figure 27:
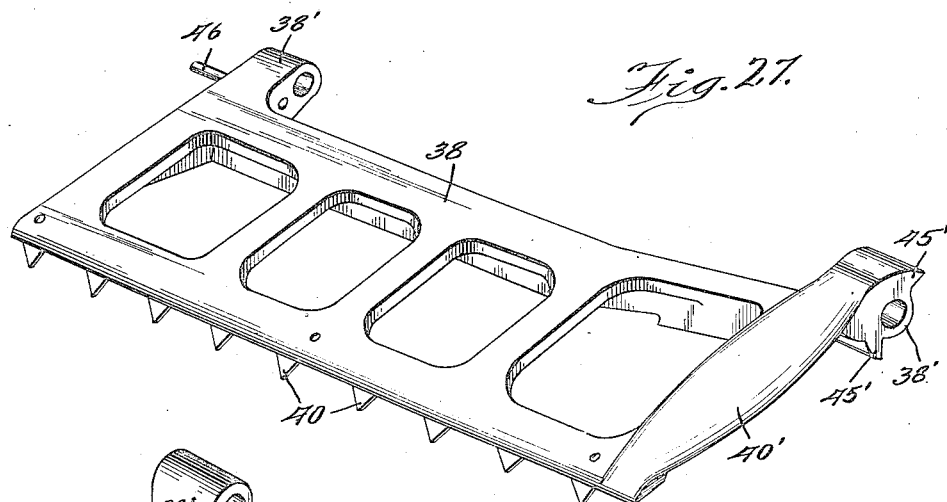
Figure 28:
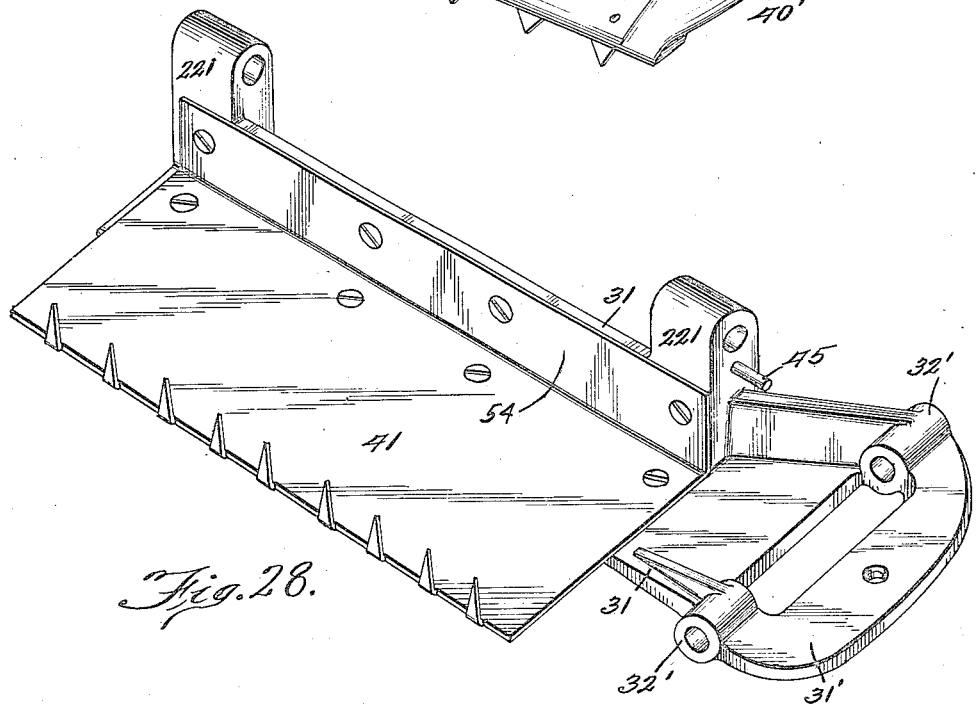

Fig. 21ª is a detail of part of the mechanism shown in Fig. 21;

Fig. 22 is an elevation as viewed from the right of Fig. 21;

Fig. 23 is an elevation showing the cam drive from the fly-wheel and the brake mechanism associated with the feed ratchet wheel;

Fig. 24 is a section of the clutch mechanism interposed in the drive for the feed chain taken on the line 24—24 of Fig. 21;

Fig. 25 is a rear elevation of the substance carriage and reversing mechanism;

Figs. 26, 27 and 28 are elements comprising the substance carriage;

Figs. 29 and 30 are enlarged end and side elevations respectively of the reversing mechanism for the substance carriage;

Fig. 29ª is a fragmentary view of a modification of the device shown in Fig. 29;

Figs. 30ª, 31 and 32 are isometric views of elements included in the reversing mechanism;

Fig. 33 is an elevation of the slice deflector;

Fig. 34 is an end view of Fig. 33;

Fig. 35 is a view of the deflector in section showing its co-operation with the slicing knife and the slice cut by the knife;

Figs. 36 and 37 show a modification of the means to operate the clutch for the driving sprocket of the carriage conveying mechanism; and Fig. 38 shows a modified form of chain tightener.

Referring to Figs. 1, 3, 12 and 13, the driving motor 1 for the machine is mounted on a motor base 5 hinged by means of a pin 5' carried by ears 6 secured to the rear bracket 7 of the machine. A bolt 8' on the bracket 5 extends through an elongated slot in an arm 8 pivoted to the bracket 7. The motor pulley 2 drives the fly-wheel 4 of the machine through a belt 3 which may be tightened by swinging bracket 5 around the pivot 5' and locking the bracket in place by means of the bolt 8'.

Figure 9:
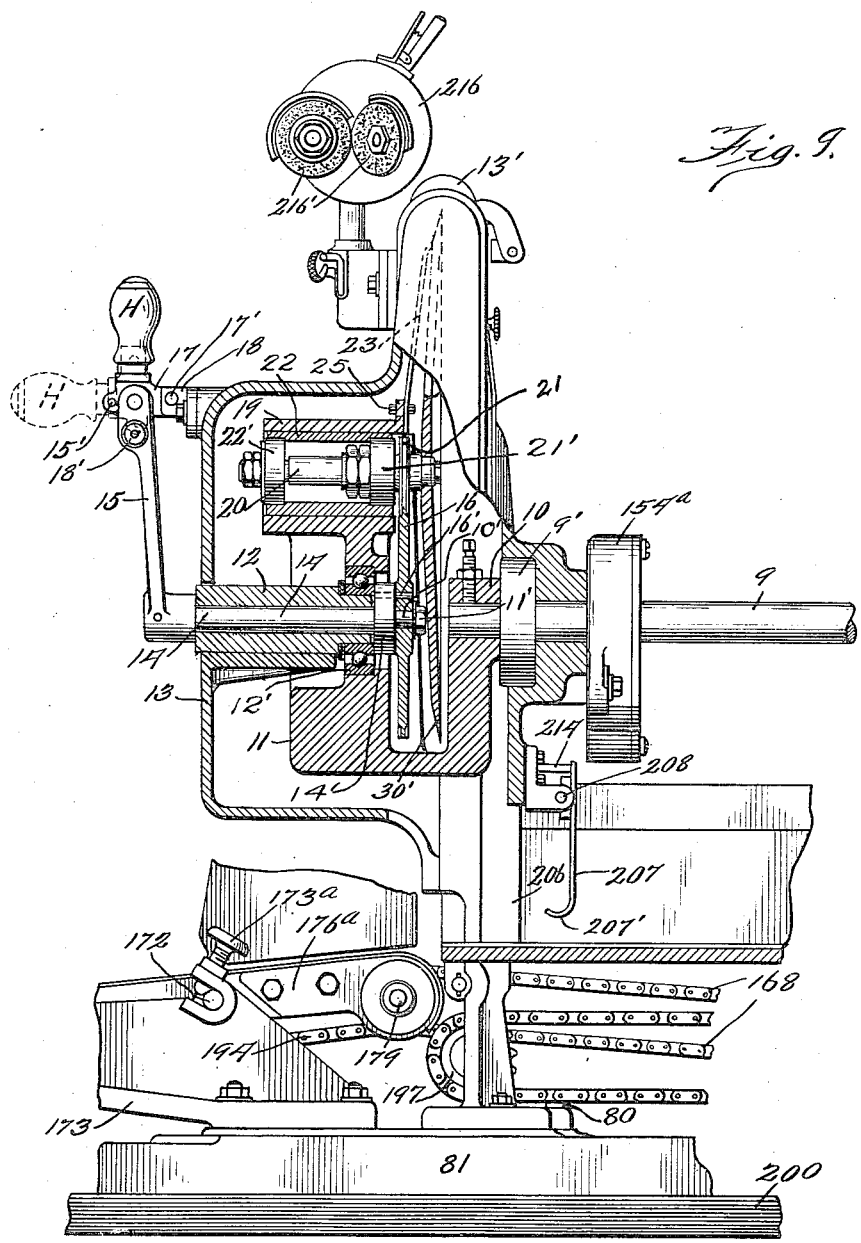
Fig. 9 is a view similar to Fig. 8 omitting the substance carriage and illustrating details of the knife mounting.

The fly-wheel 4, (Figs. 1 and 7) is secured to one end of a shaft 9 and the other end of the shaft 9 is journaled in a bearing 9' (Fig. 9). The shaft 9 has secured thereto at the end opposite the fly-wheel the arm 10 of a U-shaped member whose other longer arm 11 is journaled by means of a roller bearing 12" on a stud 12 rigid with the knife housing 13. A shaft 14 is journaled in stud 12. An enlarged flange portion 14' on said shaft forms an abutment against which a sprocket 16 on reduced portion 10' is clamped by means of a nut 11'. A pin 16' locks the shaft and sprocket together so that they will move in unison. To one end of the shaft 14 is secured a crank 15 which may be locked to the knife housing by means of the handle lock 17 and lugs 18 held together by a removable pin 17'. The handle H may be swung to the dotted line position shown and locked in that position by a pin 18' passing through openings in the bifurcated end of lever 15 and the opening 15' in the handle member. This enables one to rotate the crank 15 for a purpose later to be described.

Figure 8:
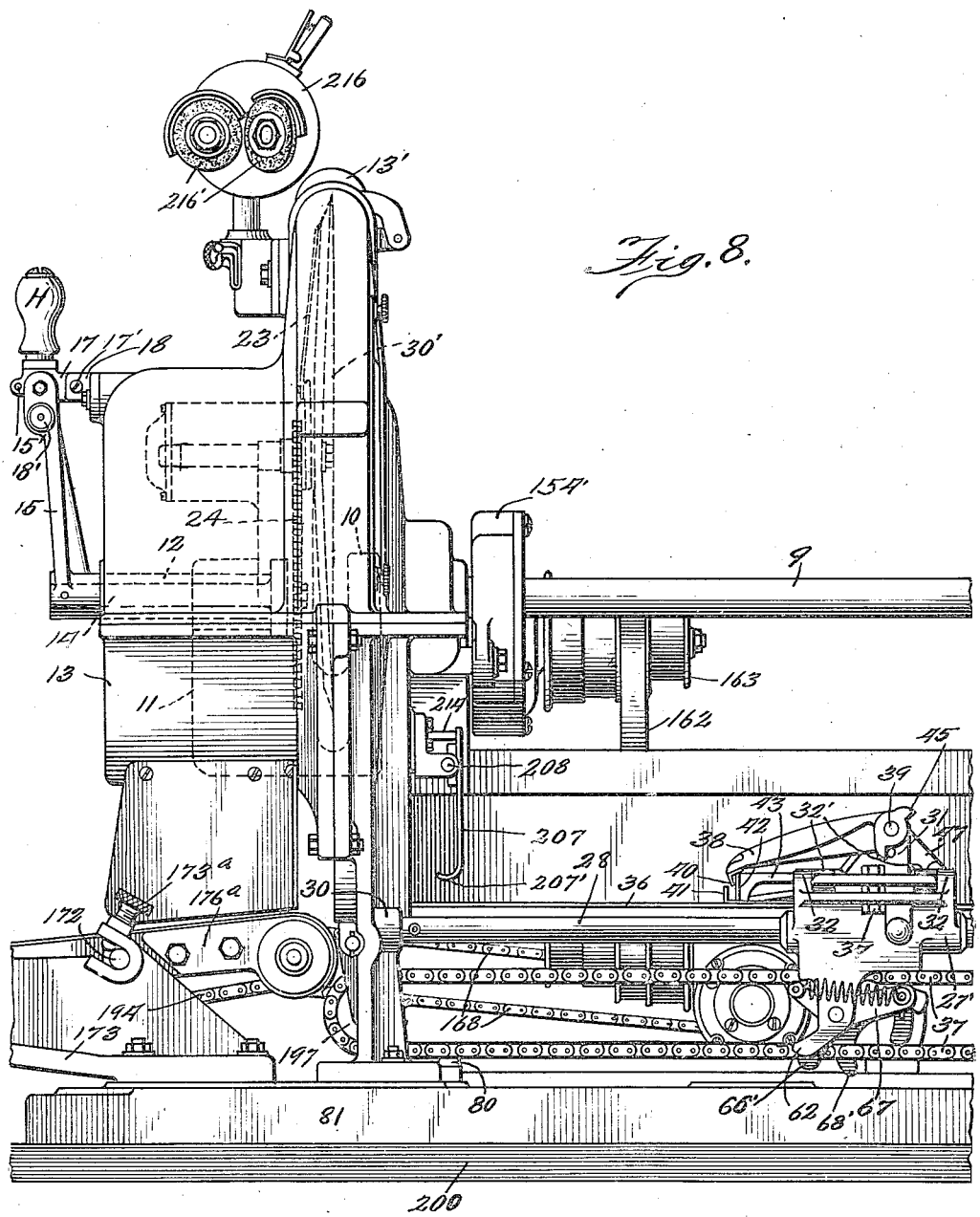
Fig. 8 is an elevational view corresponding to Fig. 4 showing the substance carriage, knife housing and a portion of the conveyer of Fig. 2 drawn to an enlarged scale.

The free end of the arm 11 is formed into a bearing 19 within which is journaled the knife spindle 20 by means of a bearing 22' containing a single row of ball bearings and a bearing 21' containing a double row of ball bearings. The bearings 21' and 22' are, as shown in Fig. 9, mounted in a bushing 22 so as to be held against movement in opposite directions and provide thrust bearings for the knife and spindle. A sprocket 21 is rigid with the knife spindle 20 and is connected to the sprocket 16 by means of a chain 24 (Fig. 8). The axis of the stud 12 about which the arm 11 revolves coincides with the axis of the shaft 9 and it will be apparent that the arms 10 and 11 rotate with the shaft 9 and that the sprocket 21, spindle 20 and knife 30' rotate because the sprocket 16 is held stationary by means of the locked crank 15 causing the chain 24 to pull relatively on the sprocket 21.

A knife shield 23 is secured to the bearing housing 19 by means of bolts 25. The rim or edge portion of the deflector bears against the knife and the edge portion of the deflector intersected by the line C—C of Fig. 33 and extends in close proximity to or slightly overlaps the beveled edge portion of the knife. As shown in Fig. 33, a portion of the edge of the deflector may be flattened somewhat as at 23' so as to be spaced further from the edge of the knife than the remainder of the deflector which is substantially concentric with the knife edge. Assuming that the arm 11 carrying the knife is rotated clockwise, as viewed from the left of Fig. 9, the knife will be rotated counter-clockwise. A slice of material cut by the knife, as designated by the letter S in Fig. 35, is therefore subject to two oppositely directed frictional forces. The knife shield rotating with the arm 11 in a clockwise direction tends to drag the slice along with it in the same direction. The periphery or edge of the knife rotates relatively to the knife shield in the opposite or counter-clockwise direction and tends to drag the slice of material cut in a direction opposite to the force exerted on the slice by the shield. These two forces tend to neutralize one another and they will be substantially exactly neutralized if the area of the slice contacted with by the knife during the cutting operation bears the proper ratio to the area of the slice contacted with by the shield. This ratio may be found by trial and varies with the character of the material to be sliced. While it is desirable to have the throwing effects of the knife and shield neutralized, still this is not absolutely necessary and either effect may be made larger than the other as desired to get a varied throwing effect on the slice.

In order that the knife shield may be properly adjusted, several slots 26' may be provided in the shield 23. These slots are all parallel to the line C—C designating the portion of the deflector lying closest to the edge of the knife and the adjustment of the shield is therefore in the direction of the line C—C. The same portion of the shield therefor lies closest to the knife edge in all adjusted positions of the shield. The cutting operation designated in Fig. 35 takes place, of course, when the knife as a whole has revolved with the arm 11 to its lowermost position opposite that indicated in Fig. 9. When the shield is properly adjusted the throwing effect on the slice by the knife shield is neutralized by the throwing effect of the knife in the opposite direction with the result that only the lateral throwing effect of the shield remains, that is, the throwng effect incident to the wedging relation of the shield with respect to the knife tending to push the slices laterally from the shield. The cut slices are therefore thrown clear of all moving parts and are stacked against each other in overlapping relation on the moving conveyer 26, (Fig. 1).

Figure 1:
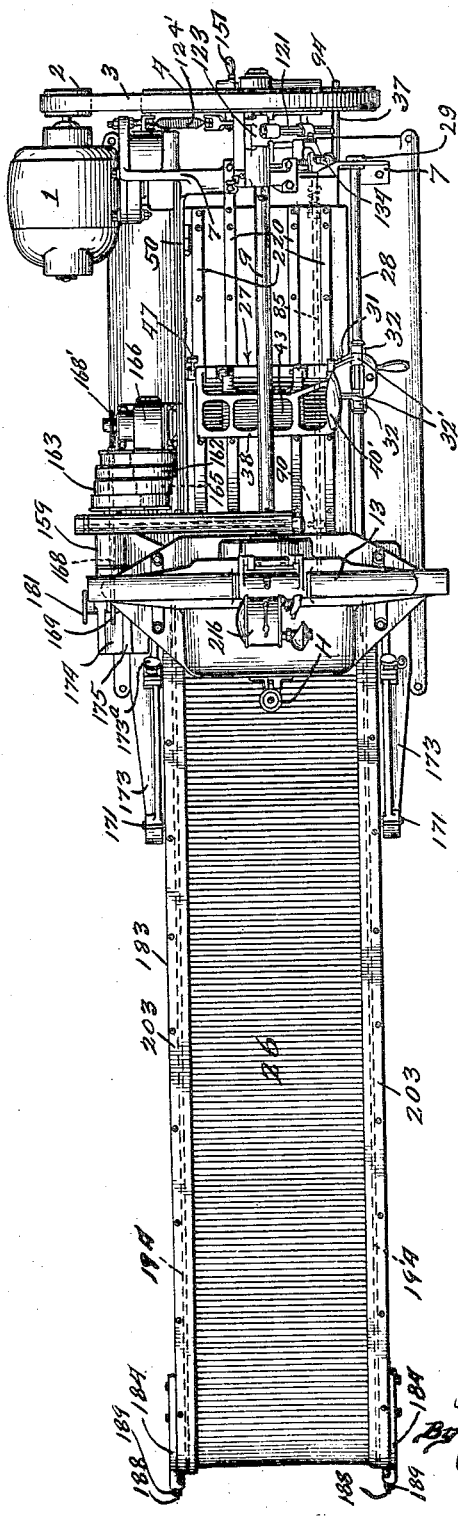
Fig. 1 is a plan view of the complete machine.

The substance carriage within which the substance is held while fed toward the knife is designated as a whole by the numeral 27 in Fig. 1 and is shown in details in Figs. 4, 19, and 25 to 28. The gripper base 31 is provided with a pair of alined lugs 32' pivotally supported by a pin 33 (Fig. 4) between a pair of upstanding lugs 32 on a sleeve 27' (Figs. 25, 29 and 30) slidable on a rod 28 secured to a lug 29 (Figs. 1, 3, 7 and 19) on the end bracket 7 and secured at its other end to a lug 30 (Figs. 8 and 19) on the bracket structure supporting the knife housing 13. A yoke 31' (Figs. 4 and 28) connects the lugs 32' and a bolt 34 extending through the yoke 31' and threaded into a boss 34' on sleeve 27' prevents rotation of the bracket 55 in either direction relative to the gripper base 31. By adjusting bolt 34 the bracket 55 (to be described later) is brought into proper alinement with feed chain 37. (See Fig. 25.) As shown in Fig. 25, the riding boss 35 slides upon one of the strips 220 upon which the material is slid by the substance carriage toward the knife.

The top gripper member 38 (Figs. 4, 19, 25 and 27) is provided with perforated lugs 38' straddling a pair of lugs 221 on the gripper base 31. The lugs 38' are pivoted on a pair of pins 39 secured to the lugs 221 by pins 222 and extending beyond the ends of each of the lugs 221. A plate 43 (Figs. 19 and 26) having an abutment face 42 is secured to the inner ends of pins 39 by means of set screws 53. The end of the material to be cut, as for example, a strip of bacon, is placed against the abutment face 42 and when the top member 38 is lowered the material is held between the teeth of the gripper plate 41 and teeth 40 of member 38. As there is but a short distance between the face 42 and the toothed gripping edges, just sufficient to grip the material, a very short butt end is left when the material has been sliced as far as possible. The plate 43, however, may be removed by releasing the set screws 53 and the end of the material placed against the abutment face 54 of the plate 41 so that a longer butt end will be left over after slicing. There is a special demand in the trade for the longer butt ends.

One of the lugs 38' is provided with a pair of stop projections 45' abutting a pin 45 (Figs. 25 and 28) to limit the swinging movement of member 38 in both directions.

The end of the upper gripper member 38 opposite the operator's position is provided with a laterally extending pin 46 (Figs. 4, 19 and 25) and a bell crank lever having arms 47 and 48 is pivoted on the end of pin 39 at the same side of the machine. The arm 48 projects under the pin 46 and the arm 47 is provided with a laterally projecting pin 49 adapted to contact with the perpendicular edge of a cam member 50 secured to the side wall 51 of the substance trough 36 when the carriage is returned by mechanism to be described. Fig. 19 shows several positions of the top grip caused by the pin 49 abutting the cam member 50. The pivot pin 39 travels in a straight line and when the arm 47 is arrested by the cam 50 the bell crank is swung clockwise (Fig. 19) raising arm 48, pin 46 and lifting top grip 38 free from the butt end of the material. This swings the top grip through the successive positions indicated in dotted lines as M and O. At the position designated O the weight of the top grip is to the right of the pin 39 and the grip will tend to rotate clockwise until the upper lug 45' strikes pin 45. The top grip 38 may then be lowered manually to grip the work and as the carriage begins its return movement the pin 49 rides freely up along cam surface 52, thus rocking arm 47 and permitting the pin 49 to position itself to the left of the cam 50 again so as to be in a position to raise the top grip 38 on the next return stroke of the carriage. The cam 50 is vertically adjustable on the wall 51 of the substance trough by means of bolts or screws 51' (Figs. 7 and 19) passing through slots 50' and screw threaded in the wall 51. By this arrangement the cam 50 can be lowered from the position shown to the dotted line position so as not to rotate the top grip 38 to the position O, but to a position such that the weight thereof is to the left of pin 39 as at N so that after the substance has been removed from the clamp and a new piece inserted, the top grip will drop of its own weight upon the substance after the pin 49 passes the top of cam 50 on its movement to the right. A handle 40' can be used to move the top grip 38 manually.

The substance carriage is moved toward and from the knife by a chain 37 the driving mechanism of which imparts a step-by-step movement to the chain when the carriage is moved toward the knife, but imparts a continuous movement to the chain to bring the carriage to its return or loading position. The carriage is moved toward the knife by the engagement of a toothed member or snag 76 (Fig. 30) with the top run of the chain 37 and is returned when the arm carrying the snag is swung to engage the snag with the lower run of the chain. This mechanism together with that effecting the intermittent and continuous drive of the chain at the proper time, will now be described.

Referring to Figs. 29 and 30, the sleeve 27' upon which the carriage is mounted has formed integral therewith a housing which may comprise a loop with a portion cut away formed by a curved wall 55 and a plane wall 62 leaving a space 56 between the edge of the curved wall 55 and the plane of the wall 62. A bell crank lever 58, (see also Figs. 30ª, 31 and 32) is pivoted on a pin 57 extending between and fixed at its ends in the walls 55 and 62. The finger-like extension of wall 62 has an upper stop face 63 and a lower stop face 62'. A bell crank lever 59 has arms 67 and 68 and also a parallel arm 67'. The bell crank lever 59 is pivoted on the pin 57 with its perforated ends 59' straddling the perforated end of bell crank 58. A pin 69 is fixed in the end of bell crank 58 and a pin 70 extends through and is fixed to the perforated arms 67 and 67' of bell crank 59, the end of pin 70 riding in a slot 64.

Figure 16:
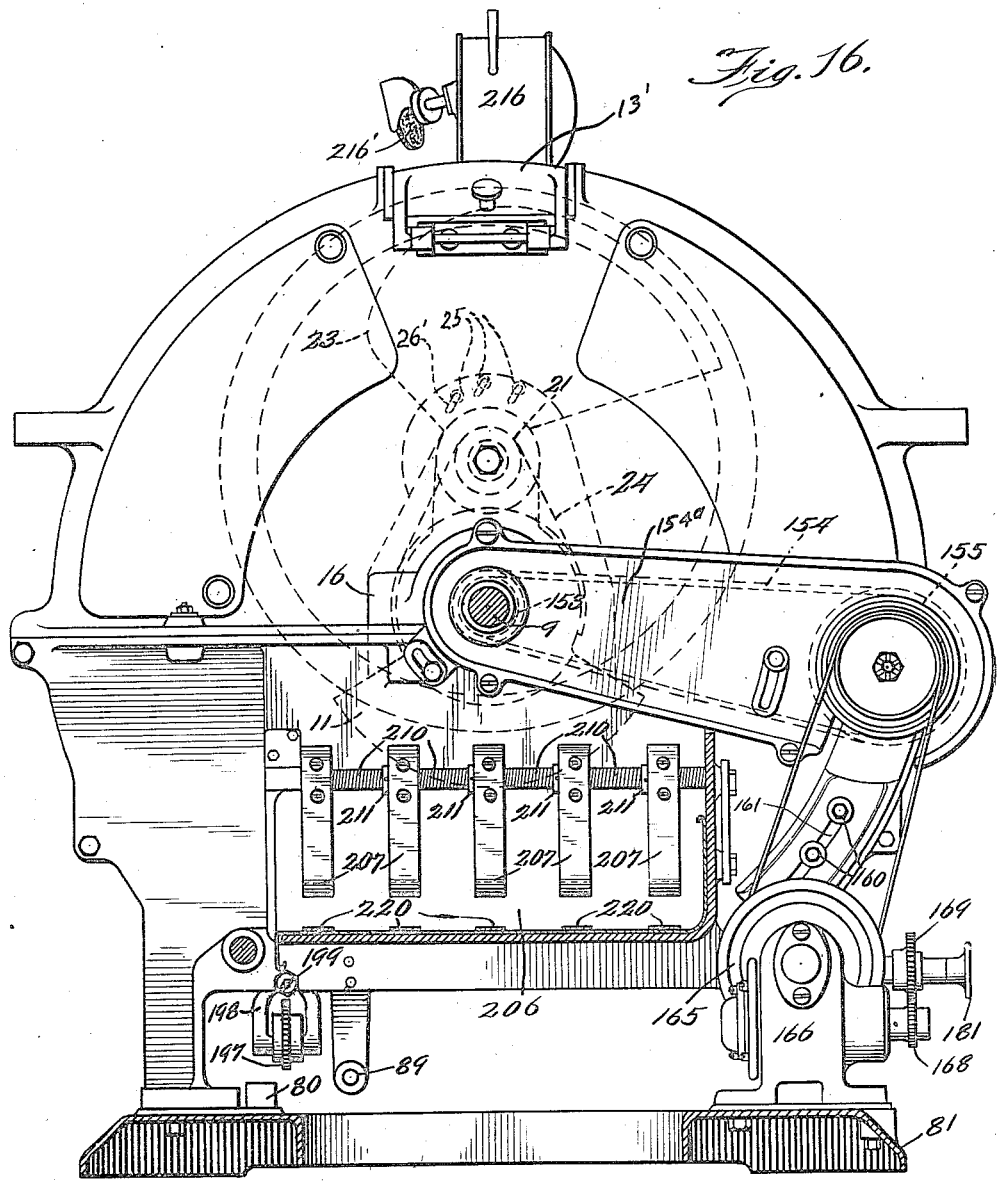
Fig. 16 is a section taken on the line A—A of Fig. 2.

The snag 76 previously referred to has a hub surrounding the pin 70 between the arms 67 and 67'. Ferrules 71 are secured to the ends of pins 69 and 70 and the ends 72 of a pair of springs 73 are looped over the ferrules at opposite sides of the bell cranks. Considering the bell crank 58 as the movable or manipulated member, it will be seen that as long as the pin 69 is above the pivot 57, the ends of the arms 65 and 67—67' move upward'y toward the chain under the action of the springs and consequently the snag 76 is held in engagement with the upper run of the chain while the end of arm 65 abuts the stop face 63. If, however, the bell crank 58 is swung about the pivot 57 so as to bring the pin 69, to which the springs are attached, below the pivot 57 the arms 67—67' of bell crank 59 will move downwardly just as soon as the springs 73 pass below the axis of pivot 57, thereby engaging the tooth 79 of the snag with the lower run of the chain. There is no relative movement of the snag with respect to the bell crank 59 because the pin 70 is pinned to one or both of the arms 67—67' and the hub of the snag is pinned to the pin 70 and the teeth 78 and 79 are properly positioned on the snag to engage the chain. When the carriage reaches the end of its feeding movement the end 66' of lever 66 engages a fixed stop 80 (Fig. 16) at the knife edge of the machine which swings the bell crank 58 counter-clockwise, bringing the springs 73 below the pivot 57 causing the snag to leave the upper run of the chain and bring it into engagement with the lower run to reverse the direction of movement of the carriage. When the carriage reaches the other end of the machine, the end 66' of lever 66 again engages a fixed stop 80ª (Figs. 7 and 22) adjustable by means of bolts 82 causing the bell crank 58 to move clockwise to bring the springs 73 above the pivot 57 and swing the snag from the lower to the upper run of the chain.

Fig. 29ª shows a modification of the device illustrated in Figs. 29 and 30, and particularly the means for supporting the chain. The parts 283, 287, 285 and 286 correspond respectively to the similar parts 61, 68', 66' and 62 of Fig. 29. 37 designates the chain in both figures. In Fig. 29ª a different means of supporting the chain is provided. This comprises a hardened steel block 289 fastened by screws 288 to the end of arm 283 and projects upwardly to engage the chain 37 to support it when the snag engages the chain. This means prevents any movement of the chain away from the snag and the hardened steel block 289 resists wear. It is sometimes desirable to hold the carriage stationary at the end of the return movement and for this purpose a sliding pin 92 (Figs. 7 and 19) is mounted in a bearing 93 in the end bracket 7. The pin 92 when slid toward the left prevents the snag from moving upwardly, the arms 67—67' of the bell crank 59 being held against upward movement by engaging the under side of the pin 92. The carriage then stands still because the snag is neither engaged by the upper or lower run of the chain. The top and bottom walls 83 and 84 (Fig. 29) serve to brace the chain to facilitate and to make certain the engagement of the snag with the chain. The pin 92 is provided with a transverse recess 94' in which are arranged the balls 93' spring pressed against the walls of the bearing 93 by a spring 92'. This mechanism holds the pin 92 in any adjustable position longitudinally of the bearing 93 by the friction exerted between the balls 93' and the inner surface of the bearing 93.

The chain passes over a driving sprocket 94 (Figs. 7 and 19) at one end and over a sprocket 197 (Fig. 16) at its other end. The sprocket 197 is mounted on a swivel bracket 198 which may be adjusted by a screw 199 to adjust the tension of the chain. The sprocket 94 is secured to a shaft 225 (Fig. 24) journaled in a bearing 226 in one end of a gear box 95 and journaled at its reduced end in a bearing 227. A collar 230 is screw-threaded on an enlarged part 228 of the shaft 225 so as to provide means to draw the clutch 233 also fastened to the shaft by a pin (not shown) and abuts against a shoulder 232 on the shaft. A spring 236' is located in a groove around collar 230 and holds in place the set screws 229 which pass through the collar into tapped holes to lock the collar in place. The clutch member 231 has gear teeth 231' about its periphery adapted to mesh with the worm 96' on worm shaft 96. The part 231 forming one element of a cone clutch has a co-operating element 234 slidable on the shaft 225 which is urged into engagement with the clutch element 231 by means of a spring 235.

A pin 236 secured to the hub of clutch element 234 passes through a slot 237 in the shaft 225 to permit sliding movement of clutch element 234 on the shaft while preventing relative rotary movement between the clutch element 234 and the shaft 225. A threaded extension 238 is rigid with the gear box 95 and has mounted thereon a cap 239 having a set screw 240 engaging the threads of extension 238. A set screw 241 having a lock nut 242 thereon is threaded into the end of cap 239 and abuts a rod 243 slidable axially through the shaft 225 and engaging the pin 236 at its other end. When cap 239 is revolved by means of handle 151 in one direction, the screw 240 co-operating with stationary threads on member 238 advances the cap 239 to the left as seen in Fig. 24, while screw 241 carried thereby abuts the rod 243; forcing it against pin 236 and sliding clutch element 234 out of engagement with clutch element 231 against the tension of spring 235. Revolving the cap 239 in the reverse direction permits the spring to force clutch element 234 into engagement with the clutch element 231.

The teeth 231' of clutch element 231 are in constant mesh with the worm 96' of a worm shaft 96 (Fig. 21) journaled in bearings 97 in the housing 95 and journaled at its other end in a bearing 99 carried by an adjustable bracket 100. A clutch ring 101 is slidably and non-rotatably mounted on the worm shaft 96 by means of key 102. The clutch ring 101 is provided on opposite sides with clutch jaws or teeth 103 and 104 adapted to engage teeth 105 on a sprocket 107 or teeth 106 on a ratchet wheel 108 depending upon the direction that the clutch ring 101 is shifted. The sprocket and ratchet are loosely mounted on the shaft 96. The sprocket 107 is continuously driven by a chain 110 passing over a sprocket 109 keyed to the fly-wheel shaft 9.

Figure 3:
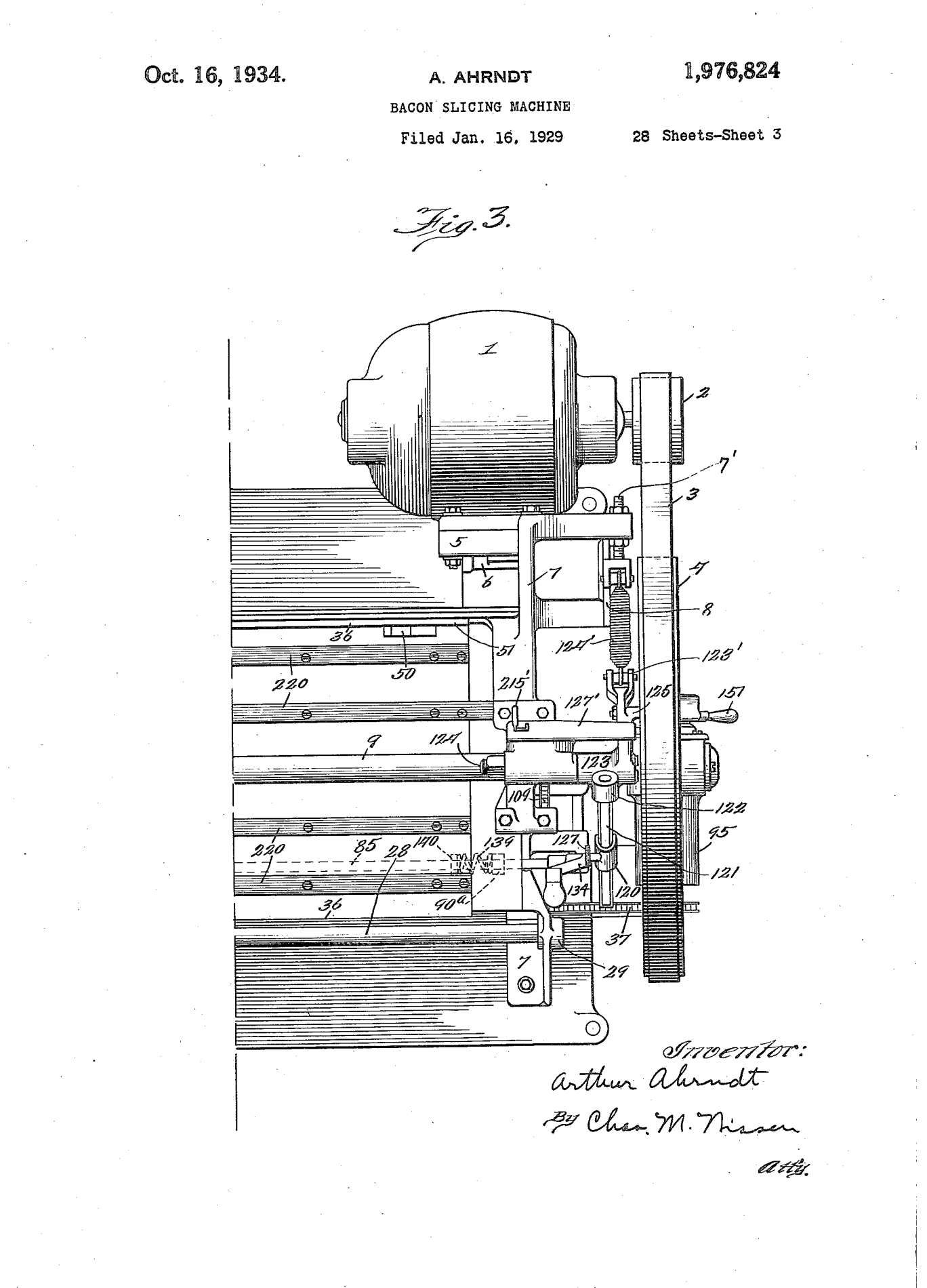
Figure 7:
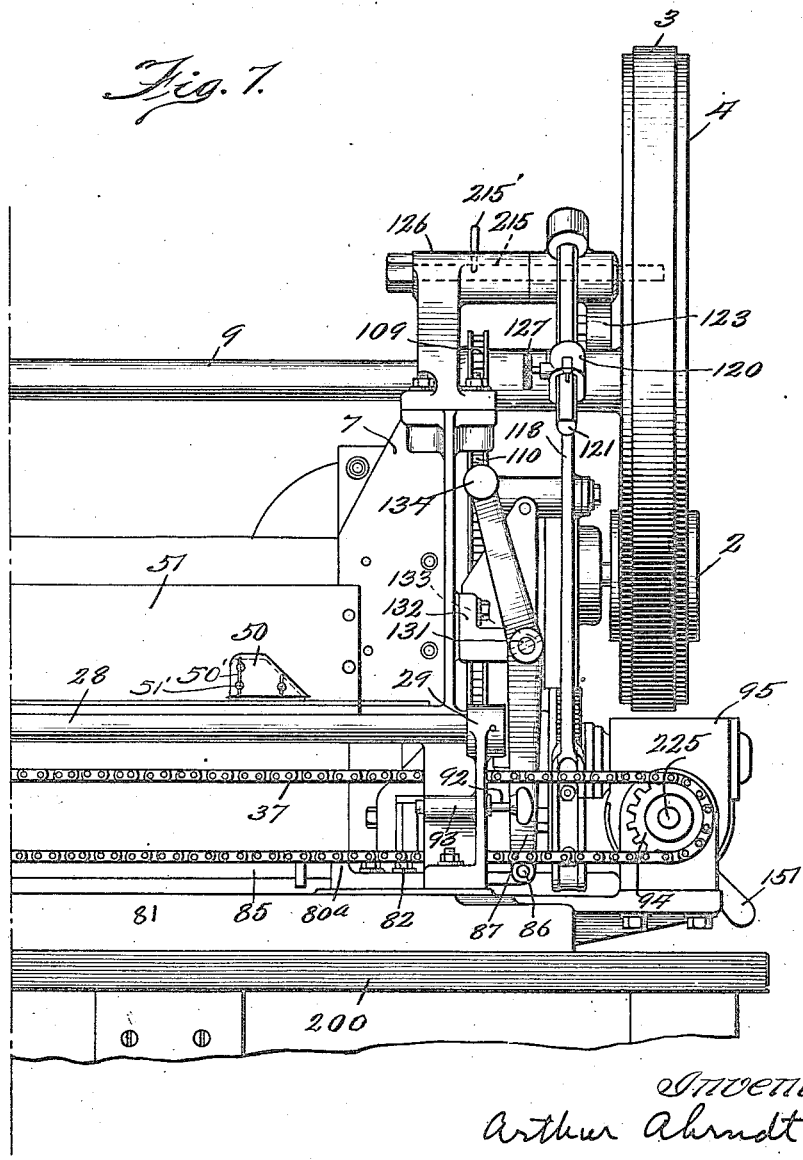
Fig. 7 is an enlarged elevational view corresponding to Fig. 3 showing the structure to the right of the substance carriage in Fig. 2 drawn to an enlarged scale.

On the hub 111 of ratchet 108 is loosely mounted an oscillating arm 112 (Fig. 22) carrying a pin 113 upon which is pivoted a pawl 114, the point 115 of which is adapted to engage the teeth 116 of ratchet 108, as also shown in Fig. 23. The end of pawl 114 is pivoted at 117 to one end of connecting rod 118, the other end of which is pivoted to a bracket 120 slidable on a shaft 121 which, as shown in Figs. 3, 7 and 23, is secured in a boss 122 of a lever 123 pivoted on a pin 124 carried by a bracket 126 (Fig. 7). The arm 123 of the lever carries a roller 125 which engages a cam 125ª on the fly-wheel. The dotted lines in Fig. 23 shows an alternative position for the bracket 120 to give only a small movement to the pawl 114. An adjusting screw 127 (Figs. 3 and 7) clamps the bracket 120 to shaft 121. The rotation of the cam 125ª on fly-wheel 4 imparts a pump handle motion to the shaft 121 causing the connecting rod 118 to pull the pawl 114 up and down with the arm 112 upon which the pawl is pivoted, thereby imparting step-by-step movement to the ratchet wheel 108 because the point 115 is pushed into engagement with teeth 116 upon upward movement of rod 118 and is pushed out of engagement with the teeth upon downward movement of the rod 118.

Clutch ring 101, as will be explained, may be shifted manually or automatically by movement of the carriage into mesh with jaws 105 on sprocket 107 or into mesh with jaws 106 on the ratchet wheel 108. If the jaws 103 mesh with sprocket jaws 105 the clutch ring and worm shaft 96 rotate continuously and therefore the movement of the chain and substance carriage is continuous. If the clutch ring jaws 104 mesh with ratchet jaws 106 the clutch ring, shaft 96 and feed chain 37 are intermittently driven by the ratchet wheel 108, as will be hereinafter more full described. The intermittent feeding, that is, the stationary period between successive movements of the mechanism driving the substance carriage is timed to take place during that part of each revolution after the knife has cut one slice and before cutting the next slice. The continuous movement is much faster than the intermittent movement and is used for returning the carriage for re-loading and for quickly advancing the material to the knife before the slicing begins.

The shifting of the clutch ring 101 is effected by means of a forked lever 128 carrying pins 129, one of which is indicated in Fig. 21 for engaging the groove 130 of the clutch ring. The lever 128 is secured to a shaft 131 journaled in a bracket 132. A hand lever 134 (Fig. 7) is attached to the shaft 131 by a pin 133 to rotate the same for causing the clutch ring to engage the sprocket 107 or ratchet wheel 108, as desired. A second lever 87 is also connected to the shaft 131 and this lever, which may be a downward extension of lever 134, is actuated by the carriage as will appear for changing the motion of the feed chain from intermittent to continuous, and vice versa. A spring 124' (Fig. 3) adjustably connects the portion 123' of the arm of the lever 123 carrying the cam roller with the framework 7 by means of an adjusting screw 7' in order to maintain the cam roller in contact with the cam face on the flywheel.

An arm 128' rigid with the forked lever 128 extends upwardly therefrom above the fulcrum 131, as shown in Fig. 22. A shank 135' (Fig. 21ª) is slidable in the arm 128' and a spring 137 exerts an upward thrust on the shank 135' which carries the triangular-shaped head 135. A pair of arms 138' extend upwardly from the lugs on brackets 132 within which shaft 131 is journaled, and a member 138 having a flattened lower face 136 is rotatably mounted on the pin 136' within the arms 138'. It will be seen that the arm 128' will be positively directed to one side or the other of the pin 136' constituting the trunnion of member 138 unless the arm 128' is positively held in intermediate position by means of the notch 137', as the spring 137 will tend to slide one of the faces 135 over the flat face 136 of member 138, thereby rotating 138 and swinging arm 128'. By this means the engagement of the clutch ring 101 with either the sprocket 107 or ratchet 108 is made sure and positive.

It will be noticed that the bell crank form of the pawl 114 and its mounting on the pivoted arm 112 causes the point 115 of the pawl to be lifted clear of the ratchet teeth 116 on the return stroke, because the operating pressure is applied at the pivot point 117. The wear and noise of the usual pawl is thereby avoided. A very light spring 143 is placed between pawl 114 and arm 112 to insure engagement between the point 115 and teeth 116 on the feeding stroke. An adjusting screw 145 on the arm 112 is positioned to contact with a projecting point 144 on the pawl.

A friction ring 144' is fastened to the ratchet 108 as shown in Figs. 21 and 23, by means of screws 145'. A friction band 146 surrounding the ring 144' is tensioned by means of nuts 150 on a rod 149 attached to one end of the band and bearing against a spring 150' which in turn bears against an arm 147 secured to the other end of the band and to the framework by a screw 148. This friction brake holds the ratchet wheel, clutch ring and connected feeding mechanism in the position where the feed pawl has placed it. It neutralizes inertia effects and prevents overfeeding, or reverse movement of shaft 96.

When the worm shaft 96 is disconnected from the feed chain drive shaft 225 by handle 151 as previously explained, the substance carriage and its chain connection is stopped, but all other parts are kept running and the effect of this feature on the stacking of the slices on the conveyer is as follows:

When the feeding of the carriage is regular the slices are stacked close upon each other, but if the feeding is stopped momentarily by throwing out the clutch connection 231—234 (Fig. 24) there will be a space between the last slice cut and the next series of slices after the clutch is re-engaged. In other words, small lots of stacked slices may be arranged on the conveyer. These lots can be conveniently handled and placed in packing boxes. This same effect may be obtained by placing the clutch ring 101 in neutral between sprocket 107 and ratchet wheel 108 by means of handle 134 and locating the point of 135 in the notch 137' in the member 138. It will be understood that due to the motion of the conveyer the slices are not stacked directly one upon the other, but in overlapping relation, depending upon the speed of the conveyer. The slices, however, may be lifted from the conveyer perfectly stacked by simply holding the foremost slice and the successive slices will be pushed together in face to face relation much the same as the overlapping cards of a deck may be scooped together to form a stack.

A rod 85 (Figs. 3, 7, 18, 22, 25, 29 and 30) is attached at one end by a pivot 86 to lever 87 and is slidably mounted in a bearing 89 (Fig. 16) at the other end of the machine. The arm 68 of bell crank 59 has a lug 68' (Figs. 25, 29, 30 and 32) adapted to strike an adjustable stop 90 adjustably fixed by screw 91 on the rod 85 at the end of the feeding movement of the carriage. The lug and consequently the rod is shifted quickly to the left until the teeth on the clutch ring 101 engage the teeth on the side of sprocket 108 causing the continuous feed of the carriage to the right because of the snag 76 now being in engagement with the lower run of the chain 37. The last part of the shifting movement of the rod 85 is due to the momentum imparted to it by the snap action of the lever 68. While this momentum is usually sufficient to cause the teeth on parts 101 and 108 to engage, as they fit rather loosely, it is not sufficient to engage the teeth on 101 with those on the ratchet 108 which is necessary at the other end of the carriage travel where the teeth of clutch ring 101 and ratchet 108 fit snugly together so that there is no lost motion.

For this reason the other end of the rod 85 is provided with a stop 140 (Fig. 3) which slides loosely on the rod 85 and is spring-pressed to the left by a spring 139 abutting a fixed stop 90ª adjustably fastened to the rod 85. When the carriage reaches this end of the machine the lug 66' strikes stop 80ª (Fig. 7) rocking the snag 76 downward, as previously described, and moving the lug 68' to the right. The movement of lug 68' to the right causes it to strike stop 140 which thrusts rod 85 to the right bringing the teeth on the clutch ring 101 and ratchet 108 into engagement. The stop 90 is so adjusted that when said teeth first strike, the lug 68' has not yet reached the full extent of its movement toward the right and if the teeth do not immediately engage as the lug 68' continues its movement toward the right, the spring 139 will be compressed. As soon as the teeth are so positioned that they will interlock, the energy stored in spring 139 will move the clutch ring the necessary amount to cause the teeth to interlock. It is obvious that where the teeth fit as closely as those on clutch ring 101 and ratchet 108 that the momentum alone would not carry the rod 85 sufficiently to the right and it is not desirable to have a fixed stop which is so adjusted as to bring the teeth into full engagement without use of some means that would yield since the gear teeth might otherwise be damaged. This form of stop may be placed at both ends of the rod 85, if desired.

A sprocket 153 (Figs. 4 and 17) is secured to the fly-wheel shaft 9 near the knife housing 13 and drives a sprocket 155 at the right-hand side of the machine by means of a chain 154, as also shown in Fig. 18. The sprocket 155 is secured by a pin 156 to a shaft 157 journaled in two bearings 158 carried by the hub 159' of a bracket 159. The bracket 159 is adjustably secured to the knife housing 13 by screws 160 (Figs. 16 and 17) passing through a slot 161 in the bracket 159 to permit the belt 162, hereinafter referred to, to be tightened.

A stepped pulley 163 is keyed to the shaft 157 by means of a key 164 and is connected by the belt 162 to a second stepped pulley 165 keyed to a shaft 157' journalled in bearings in a reduction gear housing 166 mounted on the base 81 of the machine. The shaft 157' is provided with a worm 166' meshing with a gear 167 secured to a cross-shaft 167' carrying a sprocket 168' on its outer end. A chain 168 connects the sprocket 168' with a sprocket 169 (Figs. 4, 14, 16 and 17) on the conveyer drive shaft 170 journaled in spaced bearings 175 on a bracket 174 secured to one of the main supporting brackets 173 for the conveyer.

Figure 2:
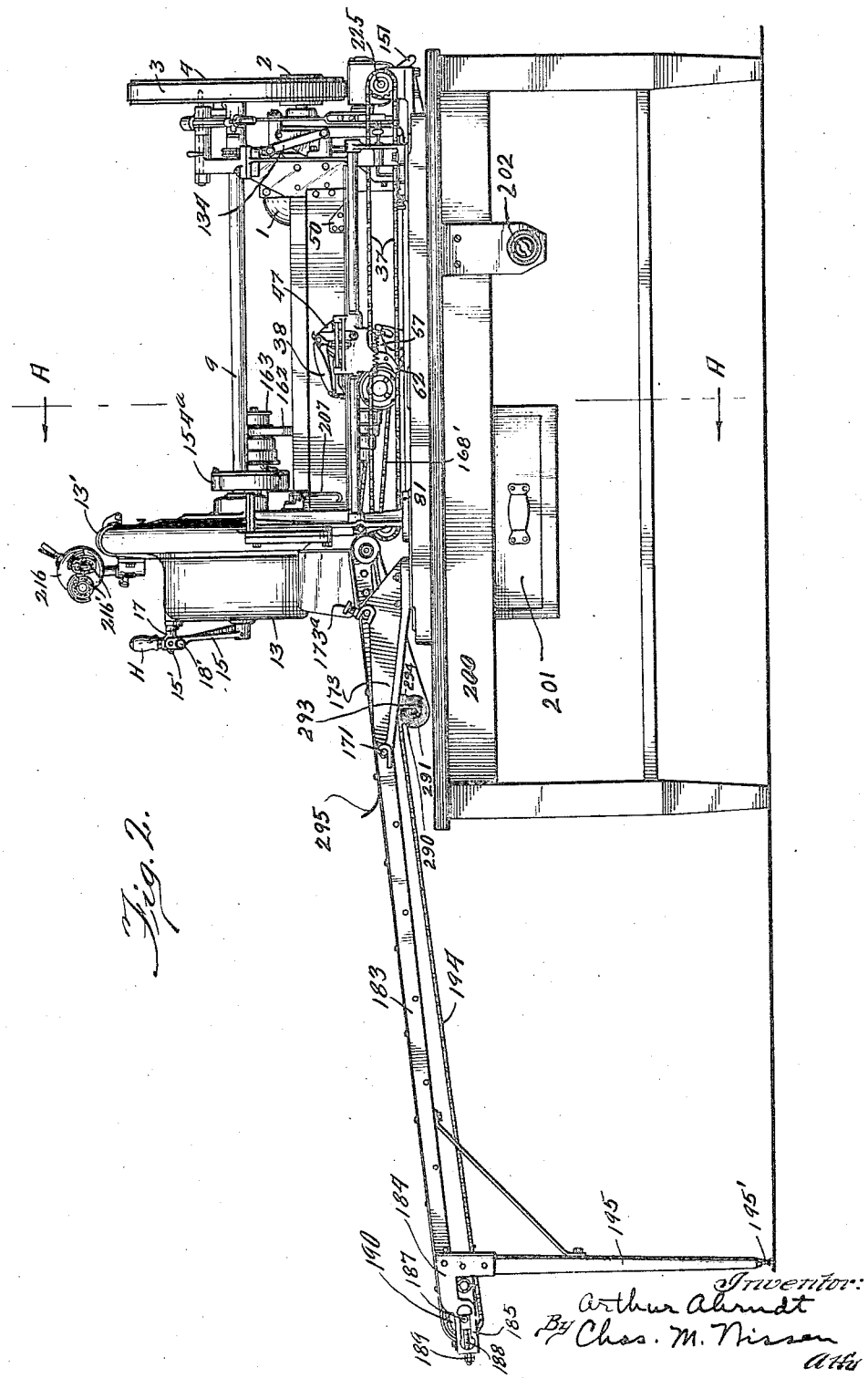
Fig. 2 is an elevational view.
Figure 4:
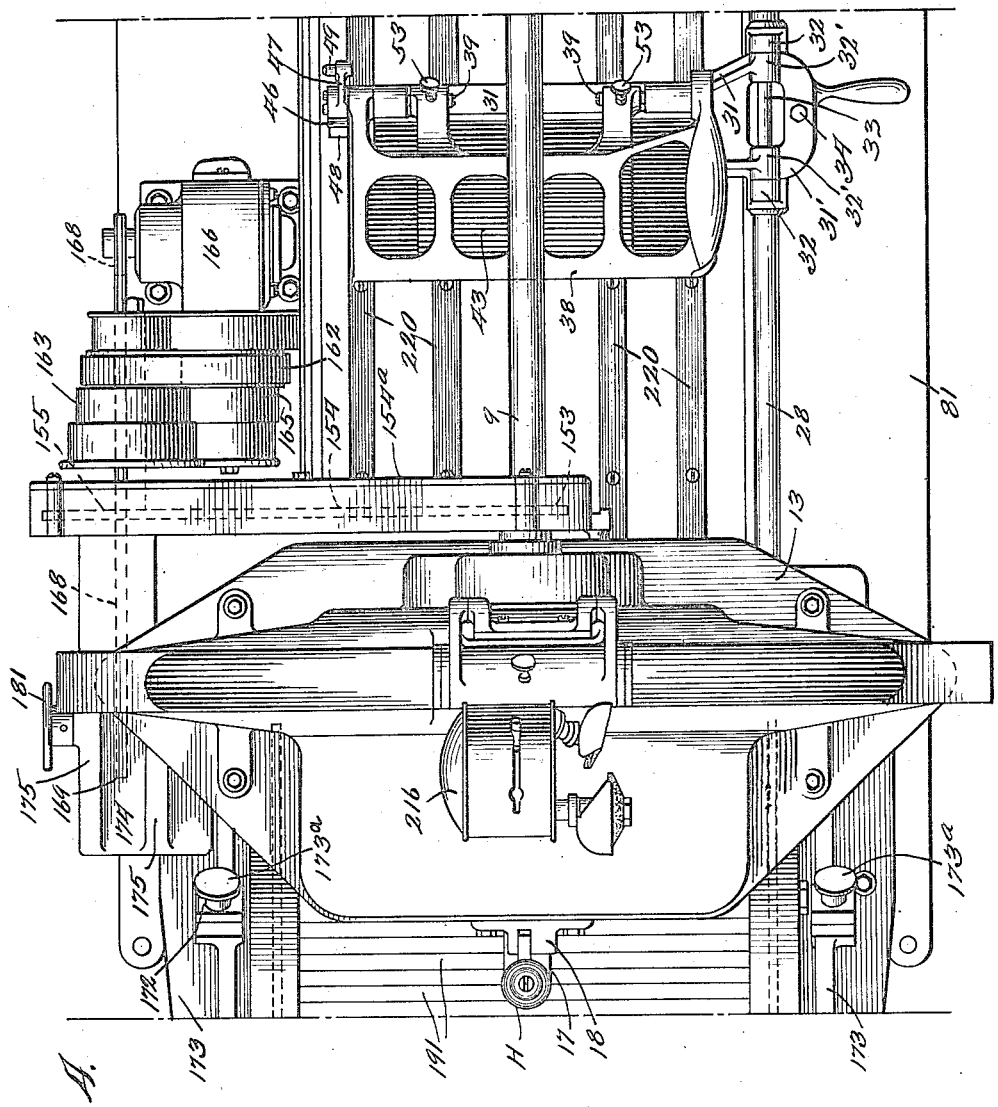
Fig. 4 is an enlarged plan corresponding to Fig. 1 including the substance carriage, knife housing and a portion of the conveyer.
Figure 5:
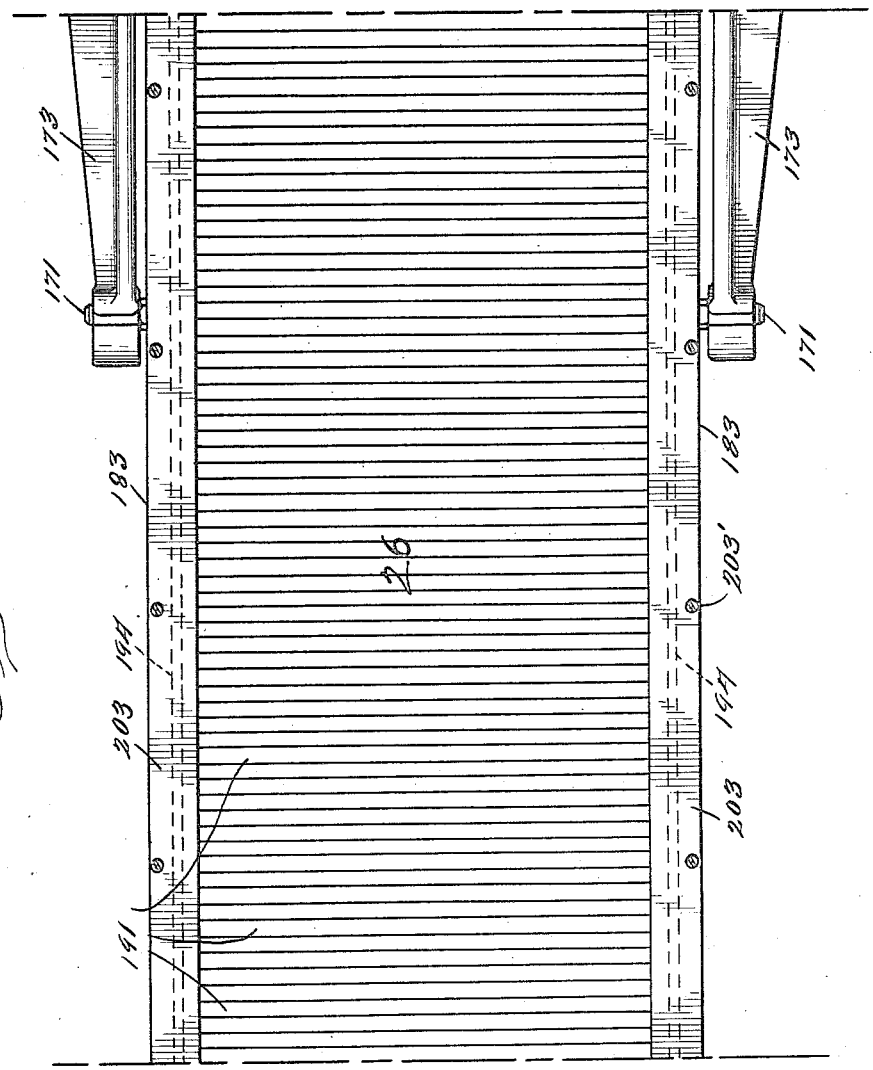
Fig. 5 is an enlarged plan view of substantially the right-hand half of the conveyer shown in Fig. 1.
Figure 6:
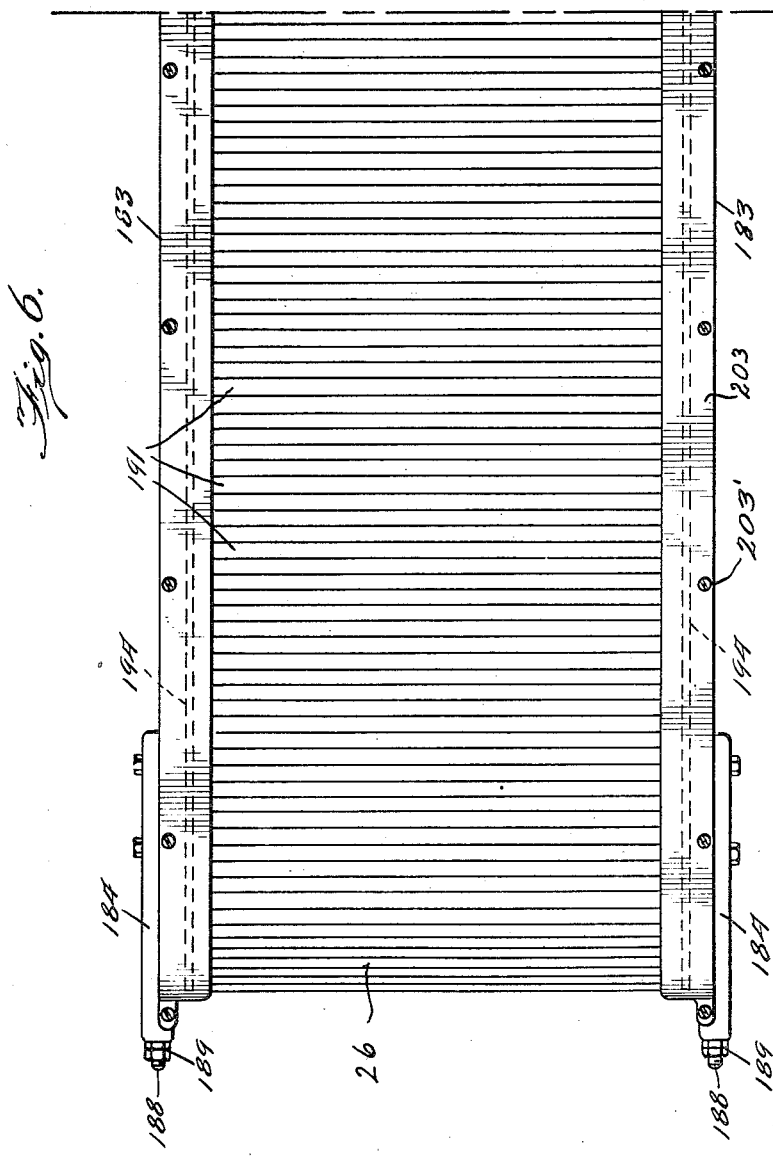
Fig. 6 is an enlarged plan view of the left-hand or end half of the conveyer shown in Fig. 1.

As shown in Figs. 1 and 2, and also referring to Figs. 5 and 10, it will be seen that the side frames 183 of conveyer 26 each carry a pair of pins 171 and 172 adapted to seat in open bearings in brackets 173, a set screw 173ª being provided to hold pins 172 in place. The other end of conveyer is supported by legs 195 connected through brackets 184 to the side frames 183, as shown in Fig. 11.

The brackets 184 have elongated slots 185 within which slide bearing blocks 186 adjustable by threaded stems 188 and nuts 189 to adjust the tension of the conveyer chains carried by sprockets 190 secured to the shaft 187 journaled in the bearing blocks 186. There is a sprocket 190 on each side of the conveyer and alined with these sprockets on the other end of the conveyer are a pair of sprockets 192, one of which is shown in Fig. 14. The sprockets 192 are pinned at 193 to a shaft 179 journaled in brackets 176ª (Figs. 8, 9 and 14) secured to the inner sides of the side frames 183. The conveyer chain 194 is cross-connected by cross-bars 191 each of which is pivotally connected at its ends to one of the links of the chain, as shown in Fig. 15, to form a continuous conveyer. Supporting rails 204, one of which is indicated in Fig. 14, extend between the runs of the chains 194 to support the upper runs thereof and are connected to the side beams 183 by screws 205 and are spaced therefrom by washers 205'. These rails serve to support the links of the chain so that the conveyer surface is kept perfectly even.

A cover 203 is secured to each of the conveyer side frames 183 by suitable means such as screws 203' and extend inwardly over the chains to protect them from dirt and a housing 154ª (Figs. 9, 16 and 17) also covers the chain 154 for the same reason. The numeral 195' in Fig. 11 designates an adjusting screw for adjusting the outer end of the conveyer at the proper elevation.

If desired, a roll of paper 290 having a spindle 291 therethrough may be rotatably mounted in the bracket 293 fastened to member 173 by bolts 294 (see Fig. 2) and the end 295 thereof passed over the end of the conveyer adjacent the knife and back over the top of the conveyer to receive the slices cut by the knife, instead of having the slices fall directly on the conveyer. The bracket 293 is made detachable, but may be made integral with the member 173, if desired. The end of the paper may be caused to move with the conveyer by any desired means, a weight resting thereon being sufficient for this purpose. It may be held against the conveyer by the hand, if desired, until a few slices have been deposited thereon, after which the weight of the slices holds the paper against the conveyer to cause it to move therewith. The paper may, if desired, be severed as separate stacks of slices approach the end of the conveyer.

Near the opening 206 (Figs. 8, 9 and 16) in the knife housing 13 through which the material enters to be pushed toward the knife, are located a series of clips 207 journaled on a shaft 208 mounted on brackets 209 on the housing 13. Springs 210 are mounted on the shaft 208 and one end of each spring engages an adjustable collar 211 secured to the shaft while the other end of the spring is fastened at 213 to a clip 207. The tension of the springs is such that they tend to rotate the clips 207 from the knife toward the fly-wheel, that is, in a counter-clockwise direction, as viewed in Figs. 8 and 9. The movement of the clips is limited by set screws 214 which locate the clips in vertical position. When the bacon or other material to be cut is pushed toward the knife its top surface engages the lower curved ends 207' of the clips 207 causing them to rotate clockwise about their pivot 208 against the tension of the springs 210 to push the material against the guide strips 220 and hold it firmly against the tendency to shift caused by the action of the knife and deflector. When the end of the material cut becomes short the curved parts 207' of the clips 207 will ride up the inclined surface of the top grip 38 rotating the clips still further against the resisting springs 210 to increase the clamping action of the top and bottom grips 38 and 41 at a time that an increased holding effect of the grips is most needed, that is, after the holding means 207 has been removed from contact with the material.

The shaft 170 (Fig. 14) which receives the drive for the conveyer shaft has secured thereto a clutch coupling 177 adapted to engage a clutch coupling 178 fixed to the shaft 179 carrying the sprockets 192 for the conveyer chain. The chain while shown moving substantially perpendicular to the plane of the knife may be moved at any other desired angle such as parallel with the knife movement.

The sprocket 169 receiving the drive is held between the two bearings 175 and is secured to the shaft 170 by means of a splined connection permitting the shaft 170 by means of its handle 181 to be slid through the sprocket 169 until the coupling 177 abuts the face 182 of one of the bearings 175, thereby disengaging the driving coupling 177 from the driven coupling 178. In this manner the conveyer shaft 179 can be set at rest while the other parts of the machine continue to operate. The whole conveyer assembly can easily be removed for cleaning or moving by pulling out the handle 181 and disconnecting coupling 177 from 178 and by loosening screws 173ª.

When it is desired to sharpen the knife the fly-wheel 4 and drive shaft 9 are locked rigidly in stationary position by means of a stud 215 (Fig. 7) which may be slid from a bearing 127' (Fig. 3) in the rear framework by means of a pin 215' into a recess in the fly-wheel 4. This recess is so positioned that the knife arm 11 will be in vertical position with the knife at the top of the housing 13. The knife sharpener 216 may be lowered when the hinged top 13' of the housing 13 is swung back so that the stones 216' properly engage the edge portion of the knife. Since this form of sharpener and its mode of operation is well known in the art it is not thought necessary to describe the sharpener in detail. The pin 17' is then removed to permit handle H to be rotated into the dotted line position shown, after which it is used to turn crank 15 and thus rotate the knife while in contact with the grinders 216' to sharpen it.

The machine is mounted on a frame or table 200 which may be provided on its upper face with a slot, not shown, through which scraps or small parts of the material cut may fall into a drawer 201 for removal at convenient intervals. An electric switch 202 is used to start and stop the motor 1.

It is to be understood, of course, that the intermittent feeding mechanism is so adjusted that the carriage is stationary during the slicing action of the knife and that the movement of the carriage takes place after the end of the severing of the last slice cut and before the knife has revolved sufficiently to engage the material to cut the next slice.

The operation of the device is as follows:

The material to be sliced is placed on the strips 220 mounted on support 36 with its ends clamped between teeth 40 and 41 on clamping members 38 and 31, respectively. The motor is started by operating switch 202; this revolves the fly-wheel and at each revolution thereof the fly-wheel gives a step-by-step rotation to the ratchet wheel 108 by means of cam 125$^a$ and connections 121, 118 and 114, and when the carriage 27 is moving to the left (Figs. 1 and 2) the clutch ring 101 is in engagement with the ratchet wheel 108, thus giving a step-by-step rotation to the shaft 225 by which sprocket chain 37 is driven. Due to the engagement of the snag 76 on carriage 27 with the upper run of the chain this step-by-step motion given to the chain is imparted to the carriage to advance the material toward the knife while the knife is at its upper or non-cutting position.

When the material has traveled sufficiently toward the knife the lug 66' strikes stop 80 and throws snag 76 into engagement with the lower run of the chain 37 causing the carriage to move away from the knife. The moving of snag 76 as just described rotates lug 68' to the left, as shown in Fig. 30, about pivot 57. The lug 68' strikes the stop 90 on rod 85 which shifts clutch ring 101 into engagement with the continuously rotating sprocket 107 by means of the connection between the rod 85 and the clutch shifting lever 128. This gives a continuous movement to the chain 37 causing it to be retracted at a uniform speed.

When the carriage reaches the extreme right-hand position (Figs. 1, 2 and 19), the top clamping member 38 is raised, as previously described, a new piece of material inserted between the clamping members and as the ring 101 is shifted again into engagement with the ratchet 108 the table again starts its step-by-step movement to the left.

During all this time the chain for carrying the slices is being driven at a constant speed and receives the slices as they are cut by the knife. If desired, the movement of the chain may be stopped by shifting clutch member 177 out of engagement with clutch member 178 by handle 181.

If it is desired to stop the reciprocating movement of the carriage without stopping the rest of the machine, the rod 92 is shifted to the left to keep the snag 76 from rotating all of the way and thus hold it out of engagement with the moving chain.

The step cone pulley is used to give varying speeds to the conveyer 26, but any other form of change speed mechanism may be used for this purpose.

While the upper run of the endless element or chain 37 is used to move the carriage toward the knife and the lower reversely moving run of the same chain is used to move the carriage rearwardly, it is apparent that the same result may be obtained by providing two separate oppositely moving chains.

In Figs. 36 and 37, I have illustrated a means for operating the clutch comprising parts such as 231 and 234 (see Fig. 24) which controls the rotation of the sprocket 94. In the present instance the clutch housing is indicated at 250 containing a clutch the same as shown in Fig. 24 and has the cap 251 corresponding to cap 239 in Fig. 24. An arm 252 extends from the housing 251 and corresponds to operating handle 151 in Fig. 24. The base 81, bracket 7 and sprocket 94 are the same as previously described.

Instead of rocking arm 252 by grasping it as is done with handle 151, a control is provided so that the operator standing in his ordinary operator's position, which is in front of the machine as shown in Fig. 2, will not have to move around to the end thereof to operate the clutch. For this purpose a bracket 256 is fastened to the housing by means of bolts 260 and has a rearwardly extending bracket portion 256' which is also fastened to the housing 250 by the bolts 260'. The bracket 256 has a bearing 258 in which is rotatably mounted a shaft 257, one end of said shaft supporting an arm 255 fastened rigidly thereto by the pin 259. Pivoted to this arm at 254 is a link 253 and this link is pivotally connected to the arm 252 so that rotation of the shaft 257 will rotate the housing 251 to operate the clutch in the same manner in which housing 239 operates the clutch in Fig. 24.

A crank 264 is pinned to the shaft 257 by a pin 265 and carries a handle 270 to enable the operator to rotate it. The handle is shown in the position in which the clutch is disengaged and since the spring 235 (see Fig. 24) is tending to return the parts to the position shown in Fig. 24, a means is provided to prevent the crank 264 from rotating so that the clutch may be left in disengaged position without attention by the operator. This means comprises a member 263 which is substantially a section of a cone, although this is not necessary as it may be cylindrical or any other desired shape to accomplish the object hereinafter set forth. This member has notches 269 and 269' adapted to receive the plunger 271 slidable in the housing 266 and spring-pressed toward the member 263 by a spring 267 backed up by a plug 268 screw-threaded in the housing 266. This plug may be used to adjust the tension on the spring 267. The member 263 is held in fixed position to a flange 261 integral with the housing 258 by screws 262. When the operator wishes to engage the clutch he rotates the crank clockwise as seen in Fig. 37. This rotates the shaft 237 and the housing 251 through the parts 255, 253 and 252 causing the engagement of the clutch in the same manner as in Fig. 24. The plunger 271 moves out of notch 269' due to the bevel thereon and rides on the plane surface of the member 263 until it drops into notch 269 upon the complete rotation of the crank 264 to the right at which time the clutch is in operative position. Since the clutch is ordinarily held in this position by the spring 235 (see Fig. 24) the notch 269 is in reality not necessary and may be omitted, if desired. It will readily be seen that the operator can now grasp the handle while standing in front of the machine and operate the clutch, greatly increasing the efficiency with which the machine may be operated.

Fig. 38 shows a modification of a device for tightening the chain 37. The sprocket 197 having a pivot 278, is mounted between the arms of a swinging yoke 276 pivoted on pin 275 mounted in a bracket 274 integral with the support 272 at the knife end of the machine. The lug 273 is for supporting one end of a rod such as 28 (Fig. 8). One of the arms of the fork 276 has an extension 277 carrying a stud 279 which passes through slot 281 in the bracket 284. This stud carries a washer 282 and a nut 280 for clamping the extension 277 and as a consequence the yoke 276 against swinging movement. The nut draws the washer 280 and extension 277 against opposite sides of the bracket 284. Thus the stud 279 can be adjusted anywhere in the slot 281 to change the position of the sprocket 197 and thus tighten the chain 37.

The copending application Serial No. 332,525, filed January 14, 1929, contains broad claims of the subject matter common to these two applications. In copending applications Serial No. 418,835 and Serial No. 431,706, there are shown other slicing machines of a slightly different construction and mode of operation. These three aforementioned copending applications are assigned to the present assignee.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a slicing machine, a rotary slicing knife, a substance carriage, a conveyer, a shaft upon which one end of said conveyer is mounted, a slidably mounted conveyer driving shaft, a cooperating clutch member on each of said shafts, driving mechanism, and means connecting said mechanism to said knife, carriage and conveyer driving shaft.

2. In a slicing machine, a substance carriage, driving mechanism, motion transmission mechanism for connecting said carriage and driving mechanism, a member driven continuously by said driving mechanism, a member driven intermittently by said driving mechanism, and means for selectively connecting said members with said motion transmission mechanism.

3. In a slicing machine, a substance carriage, driving mechanism, motion transmission mechanism for connecting said carriage and driving mechanism, a member rotated continuously by said driving mechanism, ratchet mechanism intermittently driven by said driving mechanism, and means for selectively connecting said member or ratchet mechanism with said motion transmission mechanism.

4. In a slicing machine, a substance carriage, a motor, a knife driving shaft, a carriage driving shaft, motion transmission mechanism connecting said second-named shaft and carriage, a gear element and a ratchet both loosely mounted on said second shaft, a gear element on said knife driving shaft for driving said first-named gear element, a member movable by said knife driving shaft for intermittently rotating said ratchet, and a clutch member movable to connect either said first-named gear element or said ratchet to said second shaft.

5. In a slicing machine, a substance carriage, a motor, a knife driving shaft, a carriage driving shaft, motion transmission mechanism connecting said second-named shaft and carriage, a gear element and a ratchet both loosely mounted on said second shaft, a gear element on said knife driving shaft for driving said first-named gear element, a member movable by said knife driving shaft for intermittently rotating said ratchet, a clutch member movable to connect either said first-named gear element or said ratchet to said second shaft, and a second clutch member for disconnecting said second-named shaft from said motion transmission mechanism.

6. In a slicing machine, driving mechanism, a substance carriage, a carriage driving shaft, motion transmission mechanism connecting said shaft and carriage, a gear element and a ratchet loose on said shaft, a clutch member keyed to said shaft between said gear element and ratchet, teeth carried by said gear element and ratchet, a set of teeth on said clutch for engaging the teeth on said gear element, a second set of teeth on said clutch for engaging the teeth on said ratchet, means for sliding said clutch to engage the teeth thereof with said gear element or ratchet, and means operated by said driving mechanism for continuously rotating said gear element and imparting intermittent motion to said ratchet.

7. In a slicing machine, a substance carriage, a carriage driving shaft, motion transmission mechanism connecting said shaft and carriage, a continuously rotating and an intermittently driven member both of which are loosely mounted on said shaft, clutch faces on said members, a clutch slidable on said shaft between said members, clutch faces on said clutch engageable with either of said members, and means for sliding said clutch on said shaft.

8. In a slicing machine, a substance carriage, a carriage driving shaft, motion transmission mechanism connecting said shaft and carriage, a continuously rotating and an intermittently driven member both of which are loosely mounted on said shaft, clutch faces on said members, a clutch slidable on said shaft between said members, clutch faces on said clutch engageable with either of said members, a pivoted clutch lever for shifting said clutch, an arm rigid with said lever projecting above the pivot thereof, a clutch positioning member having angularly related faces slidably carried by said arm, and a member having an abutment face adapted to contact with one of said angularly related faces to direct said arm to one side or the other of the axis of rotation of said rotatable member.

9. In a slicing machine, a substance carriage, a carriage driving shaft, motion transmission mechanism connecting said shaft and carriage, a continuously rotating and an intermittently driven member both of which are loosely mounted on said shaft, clutch faces on said members, a clutch slidable on said shaft between said members, clutch faces on said clutch engageable respectively with the clutch faces along separate ones of said members, means for sliding said clutch along said shaft, and an adjustable brake for said intermittently driven member.

10. In a slicing machine, a slicing knife, a substance carriage, a shaft, a fly-wheel on one end of said shaft, driving means between said knife and the other end of said shaft, a motor for driving said fly-wheel and carriage, a clutch for disconnecting the drive to said carriage, a pulley driven by said shaft, a conveyer driving shaft, reduction gearing connecting said pulley with said conveyer driving shaft, and a clutch for disconnecting said conveyer driving shaft from said reduction gearing.

11. In a slicing machine, a slicing knife, a substance carriage movable toward and from said knife, intermittently driven mechanism, means connecting said carriage and mechanism to feed said carriage toward said knife, continuously driven mechanism, means shiftable by the movement of said carriage at the end of the feeding movement toward said knife for reversing the direction of movement of said carriage, and means shiftable by the movement of said carriage at the end of said feeding movement to connect said carriage to said continuously driven mechanism.

12. In a slicing machine, a slicing knife, a substance carriage movable toward and away from said knife, flexible motion transmission mechanism movable toward said knife, flexible motion transmission mechanism movable away from said knife, means carried by said carriage to engage either of said mechanisms, a continuously driven member, an intermittently driven member, and means for selectively connecting said members to said flexible motion transmission mechanisms.

13. In a slicing machine, a slicing knife, a substance carriage, an endless flexible member for moving said carriage toward and away from said knife, a member on said carriage movable to engage either the forwardly or reversely moving run of said flexible member, means for intermittently driving said flexible member when the forwardly moving run thereof is engaged by said member, and means for continuously driving said flexible member when the reversely moving run thereof is engaged by said member.

14. In a slicing machine, a slicing knife, a pair of flexible elements one of which is movable toward said knife and the other of which is movable away from said knife, a substance carriage, a member on said carriage movable to engage either of said flexible elements, means for intermittently driving said first-named element when engaged by said member, and means for continuously driving said second-named element when engaged by said member.

15. In a slicing machine, a slicing knife, a carriage, a pair of flexible elements one of which is movable toward said knife and the other of which is movable away from said knife, a member on said carriage movable to engage either of said flexible elements, means for intermittently driving said first-named element when engaged by said member, means for continuously driving said second-named element when engaged by said member, means operable at the end of the feeding movement of said carriage toward said knife for moving said member from said first-named to said second-named element, and means operable at substantially the same time as said last-mentioned means for connecting said intermittent driving means to said second-named flexible element.

16. In a slicing machine, a slicing knife, a substance carriage, an endless flexible element for moving said carriage toward and away from said knife, a member on said carriage movable to engage either the forwardly or reversely moving run of said flexible element, intermittent driving mechanism connected with said element when the forwardly moving run thereof is engaged by said member, means operable at the end of the feeding movement of said carriage toward said knife for moving said member from the forwardly to the rearwardly moving run of said element, continuous driving mechanism, and means operable at substantially the same time as said last-mentioned means for connecting said continuous driving mechanism to said element.

17. In a slicing machine, a slicing knife, a carriage, a pair of flexible elements one of which is movable toward said knife and the other of which is movable away from said knife, a member on said carriage movable to engage either of said flexible elements, means for intermittently driving said first-named element when engaged by said member, means for continuously driving said second-named element when engaged by said member, means operable at the end of the feeding movement of said carriage toward said knife for moving said member from said first-named to said second-named element, means operable at substantially the same time as said last-mentioned means for connecting said intermittent driving means to said second-named flexible element, means operable at the end of said carriage remote from said knife for moving said member into engagement with said forwardly moving run, and means operable at substantially the same time as said last-mentioned means for connecting said intermittent driving mechanism to said flexible element.

18. In a slicing machine, a slicing knife, a carriage, a pair of flexible elements one of which is movable toward said knife and the other of which is movable away from said knife, a member on said carriage movable to engage either of said flexible elements, means for intermittently driving said first-named element when engaged by said member, means for continuously driving said second-named element when engaged by said member, means operable by the motion of said carriage at the end of the feeding movement of said carriage toward said knife for moving said member from said first-named to said second-named element, and means operable at substantially the same time as said last-mentioned means for connecting said intermittent driving means to said second-named flexible element.

19. In a slicing machine, a slicing knife, a substance carriage, an endless flexible element for moving said carriage toward and away from said knife, a member on said carriage movable to engage either the forwardly or rearwardly moving run of said flexible element, intermittent driving mechanism connected with said element when the forwardly moving run thereof is engaged by said member, means movable by the motion of said carriage at the end of the feeding movement of said carriage toward said knife for moving said member from the forwardly to the rearwardly moving run of said element, continuous driving mechanism, and means operable at substantially the same time as said last-mentioned means for connecting said continuous driving mechanism to said element.

20. In a slicing machine, a slicing knife, a substance carriage, a flexible element for moving said carriage toward and away from said knife, intermittently movable mechanism, continuously movable mechanism, clutch means movable into engagement with either of said mechanisms, said clutch means being in driving relation with said flexible element, movable stop means connected with said clutch, means co-operating with said stop means at the end of the forward movement of said carriage to move said clutch means into engagement with said intermittently movable mechanism, and means co-operating with said stop means at the end of the reverse movement of said carriage to move said clutch means into engagement with said continuously movable mechanism.

21. In a slicing machine, a slicing knife, a substance carriage, a flexible element for moving said carriage toward and away from said knife, a continuously rotatable toothed member, an intermittently movable toothed member, a toothed clutch member movable to separately engage the teeth thereon with the teeth on either of said members, means connecting said clutch in driving relation with said flexible element, shiftable stop means connected with said clutch, a stop member on said carriage co-operating with said shiftable stop means at the end of the forward movement of said carriage to move said clutch member into engagement with said continuously rotatable member, said stop member co-operating with said stop means at the end of the reverse movement of said carriage to move said clutch into engagement with said intermittently movable member, and resilient means interposed between said stop member and said shiftable stop means at the end of the reverse movement of said carriage.

22. In a slicing machine, a slicing knife, a substance carriage, a flexible element for moving said carriage toward and away from said knife, intermittently movable mechanism, continuously movable mechanism, clutch means movable into engagement with either of said mechanisms said clutch means being in driving relation with said flexible element, shiftable stop means connected with said clutch, a stop member on said carriage co-operating with said stop means at the end of the forward movement of said carriage to move said clutch means into engagement with said movable mechanism, said stop member co-operating with said stop means at the end of the reverse movement of said carriage to move said clutch means into engagement with said intermittently movable mechanism.

23. In a slicing machine, a slicing knife, a substance carriage, an endless flexible element for moving said carriage toward and away from said knife, a continuously rotatable toothed member, an intermittently movable toothed member, a toothed clutch member movable to separately engage the teeth thereon with the teeth on either of said members, means connecting said clutch member in driving relation with said flexible element, a member on said carriage movable to engage either the forwardly or rearwardly moving run of said flexible element, a pair of movable stops connected to said clutch member, one of said stops being positioned at the end of the forward and the other at the end of the rearward movement of said carriage, a co-operating stop on said carriage for engaging said first-named stop to engage said clutch with said continuously rotatable member and for engaging said second-named stop to engage said clutch member with said intermittently movable member, and resilient means interposed between said stop on said carriage and said stop at the end of the reverse movement of said carriage.

24. In a slicing machine, a substance carriage, a knife, chain driving means having a forwardly and reversely moving run for moving said carriage to and from said knife, means at the end of the forward movement of said carriage for shifting said snag from said forwardly moving run to said rearwardly moving run, means at the end of the rearward movement of said carriage for shifting said snag from said rearwardly moving run to said forwardly moving run, and a manually operated member movable into the path of movement of said snag to prevent engagement thereof with said forwardly moving run after said snag is disengaged from said rearwardly moving run.

25. In a slicing machine, a substance carriage, a knife, chain driving means having a forwardly and a rearwardly moving run for moving said carriage to and from said knife, a lever pivoted on said carriage, a snag on said lever, a bell crank pivoted on said carriage, a spring connecting one arm of said bell crank with said snag lever, and stop members for engaging the other arm of said bell crank to rock said bell crank at the end of the forward and rearward movement of said carriage.

26. In a slicing machine, a substance carriage, a knife, chain driving means having a forwardly and a reversely moving run for moving said carriage to and from said knife, a lever pivoted on said carriage, a snag on said lever, a movable stop member on said carriage, a spring connecting said stop member and lever, a stop at the end of the forward movement of said carriage co-operating with said stop member to shift said spring from a position above to a position below the pivot of said lever.

27. In a slicing machine, a chain driving means having a forwardly and a rearwardly moving run for moving said carriage to and from said knife, a pivot on said carriage, a snag lever having a chain-engaging snag thereon pivoted on said pivot, a bell crank pivoted on said pivot, a spring connecting said snag lever and one bell crank arm, and stop members for engaging the other arm of said bell crank to rock said bell crank at the end of the forward and rearward movement of said carriage.

28. In a slicing machine, a slicing knife, a substance carriage, means for moving said carriage toward and away from said knife, a bottom grip on said carriage, a top grip pivoted on said bottom grip, a pin projecting from said top grip, a pivoted bell crank having one arm thereof projecting under said pin, and a cam positioned adjacent the end of the rearward movement of said carriage for engaging the other arm of said bell crank, said cam having a forward vertical face, a top horizontal face and a rear sloping face.

29. In a slicing machine, the combination with a substance carriage, a motor, a knife driving shaft, a knife operatively connected to said shaft, a carriage driving shaft, motion transmission mechanism connecting said second named shaft and carriage, a gear element and a ratchet element rotatably mounted on axes in alinement with the axis of said second named shaft, means for rotating said knife driving shaft, means for continuously rotating said gear element, means for intermittently rotating said ratchet, and a clutch member slidable along said second named shaft to selectively connect said gear element on said ratchet in operative engagement with said motion transmission mechanism.

30. In a slicing machine, the combination with a substance carriage, of a power means, a knife shaft driven from said power means and operatively connected to a knife, a carriage driving shaft, motion transmission mechanism connecting said second named shaft and carriage, a gear element and a ratchet loosely mounted on said second shaft, said gear element being continuously movable by said power means, said ratchet mechanism being intermittently operable by said power means, and a clutch member for operatively connecting either said gear element or said ratchet mechanism in operative driving relation to said second named shaft to thereby impart motion to said motion transmission mechanism.

31. In a slicing machine, the combination with a substance carriage, of a power unit, a knife shaft driven from said power unit, a knife carried by said shaft, a carriage driving shaft, motion transmission mechanism connecting said second named shaft and carriage, a continuously rotatable element and an intermittently rotatable element, each being concentrically mounted with the axis of rotation of said carriage driving shaft, a clutch member for selectively connecting either of said members in driving relation to said carriage driving shaft for actuating said motion transmission mechanism, and a second clutch member for disconnecting said carriage driving shaft from said motion transmission mechanism.

32. In a slicing machine, the combination with a substance carriage, of a slicing knife, a carriage driving shaft, motion transmission mechanism connecting said shaft and carriage. a continuously rotating member and an intermittently rotating member normally free to move about their own axes, clutch faces on said members, a clutch having faces thereof opposed to said first mentioned faces, means for shifting said clutch to bring the faces thereon selectively into operative engagement with the clutch faces on said members, means for operatively connecting said clutch to said motion transmission mechanism so that when said clutch is in engagement with one of said members motion will be transmitted from that member to said motion transmission mechanism, and means for holding said clutch in operative engagement with either of said member or out of engagement with both of said members.

33. In a slicing machine, the combination with a slicing knife, of a substance carriage, an endless flexible member for moving said carriage toward and away from said knife, a member on said carriage movable to engage either the forwardly or reversely moving run of said flexible member, means selectively operable for intermittently or continuously driving said flexible member, power means for actuating each of said driving means at speeds which are regular and uniform for a given speed of said power means, and means for operatively connecting said substance carriage to either the forwardly or reversely moving run of said flexible member irrespective of whether or not said flexible member is being driven intermittently or continuously.

34. In a slicing machine, the combination with a slicing knife, of a carriage, a pair of elements one of which is movable toward said knife and the other of which is movable away from said knife, a member on said carriage movable to engage either of said elements, means for intermittently driving one of said elements, means for continuously driving said second named element, and means operable at a predetermined time during the feeding movement of the carriage in either direction for moving said member on said carriage into engagement with a selected one of said elements to reverse the direction of movement of said carriage.

35. In a slicing machine, the combination with a slicing knife, of a carriage, a flexible element having a portion thereof movable in a direction towards said slicing knife and having another portion thereof moving away from said slicing knife, a member on said carriage for selectively engaging either of said portions, means for intermittently driving said flexible element, means for continuously driving said flexible element, means for selectively connecting said intermittent driving means or said continuous driving means to said flexible element to drive the same, means operable at a predetermined time during the travel of said carriage while operatively connected to one of said portions through said member to cause said member to be shifted out of engagement with said portion and into engagement with the other of said portions, and means operable substantially simultaneously with the shifting of said member from one portion of said flexible element to the other to select the driving means which is to drive said flexible element after said member has been moved from one run thereof to the other.

36. In a slicing machine, the combination with a slicing knife, of a carriage, an element movable towards said knife, a second element movable away from said knife, a member on said carriage adapted to selectively engage either of said elements, an intermittent drive, a continuous drive, means for connecting one of said drives to one of said elements when said member is in engagement therewith and for connecting the other of said drives to the other of said elements when said member is in engagement therewith, means operable at selected positions along the path of movement of said carriage for shifting said member from one of said elements to the other of said elements, and means for substantially simultaneously connecting said element to the drive which will impart the movement thereto as previously set forth in the claim when said member is moved into engagement therewith.

37. In a slicing machine the combination with a slicing knife, of a substance carriage, an endless flexible element for moving said carriage towards and from the cutting plane of said knife, a member on said carriage movable into engagement with the run of said flexible element which is moving towards said cutting plane or away from said cutting plane to cause movement of said carriage in a corresponding direction, intermittent driving mechanism connected with said element for driving the same at a selected time while said member is in engagement with one of said runs, continuous driving mechanism for driving said flexible element when said member is in engagement with the other of said runs, and means operable at a predetermined time during the movement of said carriage along its path in one direction for shifting said member from its engagement with one of said runs into engagement with the other of said runs and for simultaneously connecting said element to that driving mechanism which is adapted to drive the flexible element when said member is in engagement with said last mentioned run.

38. In a slicing machine, the combination with a slicing knife, of a substance carriage, a flexible element for moving said carriage toward and away from said knife intermittently movable mechanism, continuously movable mechanism. clutch means movable into engagement with either of said mechanism and adapted to be driven thereby while in engagement therewith, said clutch means being in driving relation with said flexible element, movable stop means connected with said clutch, means cooperating with said stop means at the end of the movement of said carriage towards the cutting plane of the knife for shifting said clutch into driving engagement with one of said mechanisms, means cooperating with said stop, means at the end of the reverse movement of said carriage to move said clutch means into operative engagement with the other of said mechanisms, and a supplementary operating member for disconnecting said carriage from operative engagement with said flexible member.

39. A slicing machine comprising a substance carriage, a slicing knife, an endless chain for moving said carriage toward and away from said knife, driving mechanism for said chain, a snag on said carriage for engaging said chain, stop means at one end of the movement of said carriage for shifting said snag from one of the runs of said chain to the other run thereof, and means for holding said snag out of engagement with both of said runs when desired and for preventing movement of said snag into engagement with said runs.

40. A slicing machine comprising a substance carriage, a slicing knife, an endless chain having a run thereof movable towards the cutting plane of said knife and a run movable away from said cutting plane, a snag on said carriage for engaging the runs of said chain, means for shifting said snag from its engagement with one of said runs into engagement with the other of said runs at both ends of the travel of said carriage and means operable at one end of the travel of said carriage for preventing said shifting movement of said shifting means in its entirety, said last mentioned means permitting movement of said snag out of engagement with the run with which it has been in engagement but preventing movement of said snag into engagement with the other of said runs.

41. A slicing machine comprising a substance carriage, an element movable in one direction for feeding said carriage in one direction, an element movable in the opposite direction for moving said carriage in an opposite direction to that in which it was being moved by the first mentioned element, a member on said carriage for engaging each of said elements selectively, means for moving said member into engagement with either of said elements, and means for holding said member out of engagement with both of said elements.

42. A slicing machine comprising a substance carriage, a slicing knife, chain driving means having a forwardly and rearwardly moving run for moving said carriage to and from said knife, an arm movable on said carriage, a snag on said arm, a second arm movably mounted on said carriage, a spring connecting said arms, and means for moving one of said arms during the movement of said carriage in one direction to thereby shift the other of said arms to move said arm carrying said snag into engagement with a selected one of said runs and for holding said snag in engagement therewith.

43. In a slicing machine, a chain driving means having a forwardly and a rearwardly moving run for moving said carriage to and from said knife, a pivot on said carriage, a snag arm having a chain engaging snag thereon, a second arm pivoted to said carriage, a spring connecting said arms, and means for moving said second mentioned arm at a predetermined time during the movement of said carriage in one direction to rock said snag arm to thereby cause said snag to move from one of said runs towards the other of said runs.

44. In a slicing machine the combination with a slicing knife, of means for advancing the substance to be sliced towards the cutting plane of said knife, a flexible element having portions thereof movable towards and from said cutting plane, and means for connecting said first mentioned means to said flexible element comprising a pivoted arm carrying a snag, a spring for shifting said snag from its engagement with one of said runs into engagement with the other of said runs, and an operating means for shifting the position of said spring to cause said spring to shift said snag from its engagement with one of said runs into engagement with the other of said runs.

45. A slicing machine comprising an endless flexible element having runs thereof movable in opposite directions, substance moving means, and means operatively connecting said substance moving means to said endless flexible element comprising pivoted levers having a common pivot, springs operatively connected to said levers and lying on one side of said pivot when said levers are in one position and on the other side of said pivot when said levers are in another position, said spring resisting movement of said levers from one position to the other, a snag on one of said levers adapted to engage a run of said flexible element, said spring acting to hold said snag into engagement with said element, and means for moving said flexible element.

46. A slicing machine comprising an endless flexible element having runs thereof movable in opposite directions, substance moving means, and means operatively connecting said substance moving means to said endless flexible element comprising pivoted levers having a common pivot, springs operatively connected to said levers and lying on one side of said pivot when said levers are in one position and on the other side of said pivot when said levers are in another position, said spring resisting movement of said levers from one position to the other, a snag on one of said levers adapted to engage a run of said flexible element, said spring acting to hold said snag into engagement with said element, and means for moving said flexible element selectively with different motions.

47. A slicing machine comprising an endless flexible element having runs thereof movable in opposite directions, substance moving means, and means operatively connecting said substance moving means to said endless flexible element comprising pivoted levers having a common pivot, springs operatively connected to said levers and lying on one side of said pivot when said levers are in one position and on the other side of said pivot when said levers are in another position, said spring resisting movement of said levers from one position to the other, a snag on one of said levers adapted to engage a run of said flexible element, said spring acting to hold said snag into engagement with said element, and means for moving said flexible element selectively with different motions and independently of the position of said snag.

48. A device as claimed in claim 45 in which means is provided for shifting said snag from its engagement with one of said runs into engagement with the other of said runs at a predetermined time during the movement of said substance moving means towards said knife.

49. In a slicing machine, the combination with a slicing knife mounted so as to rotate about its own axis and to move bodily about an axis eccentric to its own axis, a substance support movable towards and away from the cutting plane of said knife, a clamp on said substance support, means for continuously reversing the movement of said support at the end of its travel toward and also away from said knife, and means operable at one end of the path of movement of said support for releasing said clamping means.

50. A device as claimed in claim 49 in which an endless conveyer is positioned adjacent said slicing knife for receiving slices directly as they are formed in overlapping relation to each other and for conveying the slices away therefrom after they have been cut from the substance being sliced.

51. In a slicing machine, the combination with an endless chain, of a slicing knife, a shaft operatively connected to said chain for driving the same, a ratchet and a gear loosely mounted on said shaft, a clutch interposed between said ratchet and said gear and secured to said shaft, means for driving said ratchet and said gear, means for shifting said clutch to operatively engage said clutch with said ratchet or said gear, a clamp for moving the substance to be sliced towards the cutting plane of the knife, a member on said clamp for selectively engaging either run of said chain, a conveyer for conveying slices away from said knife after they have been cut from said substance, and means for moving said member selectively into engagement with either of the runs of said chain.

52. A device as set forth in claim 51 which includes means for shifting said member on said clamp from engagement with one of the runs of said chain into engagement with the other of the runs of said chain at either end of the path of movement of said clamp and in which a means is provided for preventing the operation of said last mentioned means adjacent one end of the travel of said clamp.

53. In a slicing machine, the combination with a slicing knife, of a substance support, means for moving said support towards and from the cutting plane of said knife, comprising a chain, driving means for said chain, a member on said support adapted to engage said chain on one side thereof, and a support arranged on the other side of said chain for preventing movement of said chain away from said member.

54. A slicing machine comprising a slicing knife, substance advancing means for advancing the substance toward said knife, a chain having runs thereof moving in directions towards and away from said slicing knife, a snag on said substance advancing means, a spring for holding said snag in engagement with either of said runs, means for shifting said snag from its engagement with one of said runs into engagement with the other of said runs, means for driving said chain selectively with different motions, and means for simultaneously changing the motion imparted to said chain when said snag is shifted from one run of said chain to the other run thereof.

55. A slicing machine having a slicing knife comprising an endless flexible element having runs thereof movable in opposite directions, towards and from the cutting plane of said knife substance moving means, and means operatively connecting said substance moving means to said endless flexible element comprising pivoted levers, springs operatively connected to said levers and lying on one side of said pivot when said levers are in one position and on the other side of said pivot when said levers are in another position, said springs resisting movement of said levers from one position to the other, a snag on one of said levers adapted to engage a run of said flexible element, said springs acting to hold said snag in engagement with said element, and means for moving said flexible element.

56. In a slicing machine, the combination with a substance carriage, of a knife, chain driving means having a forwardly and rearwardly moving run for moving said carriage to and from said knife, a snag operatively connected to said carriage means operable at the end of said movement of said carriage for shifting said snag from said forwardly moving run to the rearwardly moving run, means operable at the end of the rearward movement of said carriage for shifting said snag from said rearwardly moving run to said forwardly moving run, and manually controlled means operable if and when desired for preventing the movement of said snag into engagement with said forwardly moving run when said means which is operable at the end of the rearward movement of said carriage shifts said snag out of engagement with said rearwardly moving run toward said forwardly moving run, whereby the movement of said carriage by said chain ceases.

57. In a slicing machine, the combination with a substance moving means, of a slicing knife, a drive shaft for actuating said moving means, motion transmitting mechanism connecting said shaft and moving means, a continuously rotating member and an intermittently rotating member continuously actuated and normally moving free about their own axes, clutching means on said members, additional clutch members connected in driving relation to said shaft, each having clutching means thereon for cooperating with a corresponding one of said clutching means on said first members, means for shifting said additional clutch members to bring the clutching means thereof selectively into operative engagement with the clutching means on said intermittently and continuously rotating members, and means for holding the clutching means on said additional members in operative engagement with the respective clutching means on said first mentioned members or for holding both of said clutching means on said additional members in a neutral position out of engagement with said clutching means on said intermittently and continuously rotating members.

58. In a slicing machine, the combination with a rotatable shaft, of an arm secured to said shaft to rotate therewith, a knife rotatably mounted on said arm eccentric of the axis of said shaft, means for rotating said shaft continuously, a substance support, mechanical uniformly actuated means movable in timed relation with the movement of said knife for moving said support toward said slicing knife with a step by step movement, mechanical means moved in timed relation to the rotation of said knife shaft for moving said substance support toward said knife with a continuous movement, and means for selectively connecting either of said last two mentioned means in driving relation to said support, whereby said support is driven positively with either a uniform step by step movement or with a continuous movement in a direction toward the knife.

59. In a slicing machine, the combination with a slicing knife mounted to rotate about its own axis and an axis arranged in spaced parallel relation to its own axis, means for moving the substance toward and away from the cutting plane of said knife, a continuously driven member, and mechanical means selectively operable for imparting a step by step or continuous movement of the substance moving means from said continuously driven member in a direction either toward or away from said slicing knife.

60. In a slicing machine, the combination with a slicing knife, of a substance moving means movable toward and away from said knife, motion transmitting mechanism movable toward said knife, motion transmitting mechanism movable away from said knife, means movable with the substance moving means adapted to engage either of said mechanisms, a continuously driven member, an intermittently driven member, and means for selectively connecting said members to said motion transmitting mechanisms to actuate the same.

61. In a slicing machine the combination with a slicing knife of a substance advancing means, mechanism for intermittently moving said advancing means toward said knife, mechanism for moving said advancing means toward said knife at a uniform, uninterrupted, controlled speed, and means for selectively actuating either of said mechanisms while simultaneously preventing actuation of the other of said mechanisms.

ARTHUR AHRNDT.